US012717968B1

(12) United States Patent
Schmitt et al.

(10) Patent No.: US 12,717,968 B1
(45) Date of Patent: Aug. 25, 2026

(54) APPARATUS FOR AND METHOD OF SECURE DATA PARTITIONING AND ZERO-RETENTION ARTIFICIAL INTELLIGENCE (AI) INTERACTION

(71) Applicant: Longevity Strategists, Inc., Falls Church, VA (US)

(72) Inventors: Suzanne Schmitt, Summerville, SC (US); Jennifer Late, Tysons, VA (US); Tom West, Falls Church, VA (US); Eli Wood, Boulder, CO (US); Keith Pattison, Boulder, CO (US); Bobby Nicholson, Austin, TX (US)

(73) Assignee: Longevity Strategists, Inc., Falls Church, VA (US)

( * ) Notice: Subject to any disclaimer, the term of this patent is extended or adjusted under 35 U.S.C. 154(b) by 0 days.

(21) Appl. No.: 19/425,034

(22) Filed: Dec. 18, 2025

(51) Int. Cl.
*G06F 21/00* (2013.01)
*G06F 21/62* (2013.01)

(52) U.S. Cl.
CPC .. *G06F 21/6254* (2013.01); *G06F 2221/2141* (2013.01)

(58) Field of Classification Search
None
See application file for complete search history.

(56) References Cited

U.S. PATENT DOCUMENTS 7,322,047 B2 * 1/2008 Redlich .................. H04L 63/10 713/193
8,234,477 B2 * 7/2012 Shaath ............... G06F 21/6227 711/163
8,869,299 B2 * 10/2014 Charbonneau .......... G06F 21/64 726/28
11,803,338 B2 * 10/2023 Gold ....................... G06F 3/067
11,954,112 B2 * 4/2024 Siebel ....................... G06F 8/10
(Continued)

FOREIGN PATENT DOCUMENTS

IN 202411103796 A 1/2025
IN 202521066680 A 8/2025

OTHER PUBLICATIONS

S Titov et al AMulti-agent Onboarding Assistant based on Large Language Models, Retrieval Augmented Generation, and Chain-of-Thought "ACMISBN979-8-4007-1276-0/2025/06FSE Companion '25, Jun. 23-28, 2025, T".

*Primary Examiner* — Maung T Lwin
(74) *Attorney, Agent, or Firm* — Caldwell LLC

(57) ABSTRACT

An apparatus for and method of secure data partitioning and zero-retention AI interaction. The apparatus includes a processor and a memory storing instructions to receive a user response via a graphical user interface, store the user response in a first partition of an internal database and execute a data minimization pipeline on the stored user response to generate a minimized user response stored in a second partition isolated by an access control policy. The processor is further configured to route the minimized user response from the second partition to an AI model endpoint through a zero-retention gateway, receive an AI-generated response from the AI model endpoint via the zero-retention gateway and transiently store the AI-generated response in a third partition for a session duration. Lastly, the processor updates the graphical user interface with the AI-generated response and associated data retrieved from the first or second partition.

16 Claims, 9 Drawing Sheets

(56) References Cited

U.S. PATENT DOCUMENTS

| | | | | |
|---|---|---|---|---|
| 2011/0208603 | A1* | 8/2011 | Benefield | G06Q 20/202 715/705 |
| 2015/0150100 | A1* | 5/2015 | Soni | H04L 63/0876 726/7 |
| 2017/0357901 | A1 | 12/2017 | La Placa | |
| 2023/0153450 | A1* | 5/2023 | Mainer | H04L 67/10 726/27 |
| 2025/0181737 | A1* | 6/2025 | Anjan | G06F 21/62 |
| 2025/0209396 | A1 | 6/2025 | Thakur et al. | |
| 2026/0024037 | A1* | 1/2026 | Mystetskyi | G06Q 10/06316 |

* cited by examiner

Input 312
Output 308
Machine-Learning Module 300
Dedicated Hardware Unit 336
Machine-Learning Model 324
Unsupervised Machine-Learning Process 332
Lazy Learning Process 320
Supervised Machine-Learning Process 328
Training Data 304
Training Data Classifier 316

FIG. 6
600
605
Receiving at Least a User Response
610
Storing the at Least a User Response
615
Executing a Data Minimization Pipeline
620
Routing at Least a Minimized User Response
625
Receiving an AI-generated Response
630
Modifying a Graphical User Interface

APPARATUS FOR AND METHOD OF SECURE DATA PARTITIONING AND ZERO-RETENTION ARTIFICIAL INTELLIGENCE (AI) INTERACTION

FIELD OF THE INVENTION

The present invention generally relates to the field of data privacy systems and artificial intelligence interaction frameworks. In particular, the present invention is directed to an apparatus for and method of secure data partitioning and zero-retention AI interaction.

BACKGROUND

Artificial intelligence (AI) systems are increasingly integrated for automated reasoning, and interactions. However, these integrations often require the exchange of user-provided information with external modules, introducing potential risks of data leakage, unauthorized retention, or inadvertent disclosure of sensitive information. Accordingly, there exists a need for an improved apparatus that address such challenges.

SUMMARY OF THE DISCLOSURE

In some aspects, the techniques described herein relate to an apparatus for secure data partitioning and zero-retention artificial intelligence (AI) interaction. The apparatus includes at least a processor, and a memory communicatively connected to the at least a processor, wherein the memory contains instructions configuring the at least a processor to receive at least a user response from a graphical user interface, store the at least a user response within a first partition of a plurality of partitions of an internal database, execute a data minimization pipeline on the at least a stored user response to generate at least a minimized user response, wherein the at least a minimized user response is stored in a second partition of the internal database, wherein the second partition is isolated from the first partition by an access control policy, route, from the second partition, the at least a minimized user response to at least an AI model endpoint through a zero-retention gateway, receive an AI-generated response from the at least an AI model endpoint through the zero-retention gateway, wherein receiving the AI-generated response includes transiently storing the AI-generated response in a third partition of the internal database for a session duration, and modify the graphical user interface to include the AI-generated response retrieved from the third partition and associated data retrieved from at least one of the first partition and the second partition.

In some aspects, the techniques described herein relate to a method of secure data partitioning and zero-retention artificial intelligence (AI) interaction. The method includes receiving, using at least a processor, at least a user response from a graphical user interface, storing, using the at least a processor, the at least a user response within a first partition of a plurality of partitions of an internal database, executing, using the at least a processor, a data minimization pipeline on the at least a stored user response to generate at least a minimized user response, wherein the at least a minimized user response is stored in a second partition of the internal database, wherein the second partition is isolated from the first partition by an access control policy, routing, using the at least a processor and from the second partition, the at least a minimized user response to at least an AI model endpoint through a zero-retention gateway, receiving, using the at least a processor, an AI-generated response from the at least an AI model endpoint through the zero-retention gateway, wherein receiving the AI-generated response includes transiently storing the AI-generated response in a third partition of the internal database for a session duration, and modifying, using the at least a processor, the graphical user interface to include the AI-generated response retrieved from the third partition and associated data retrieved from at least one of the first partition and the second partition.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
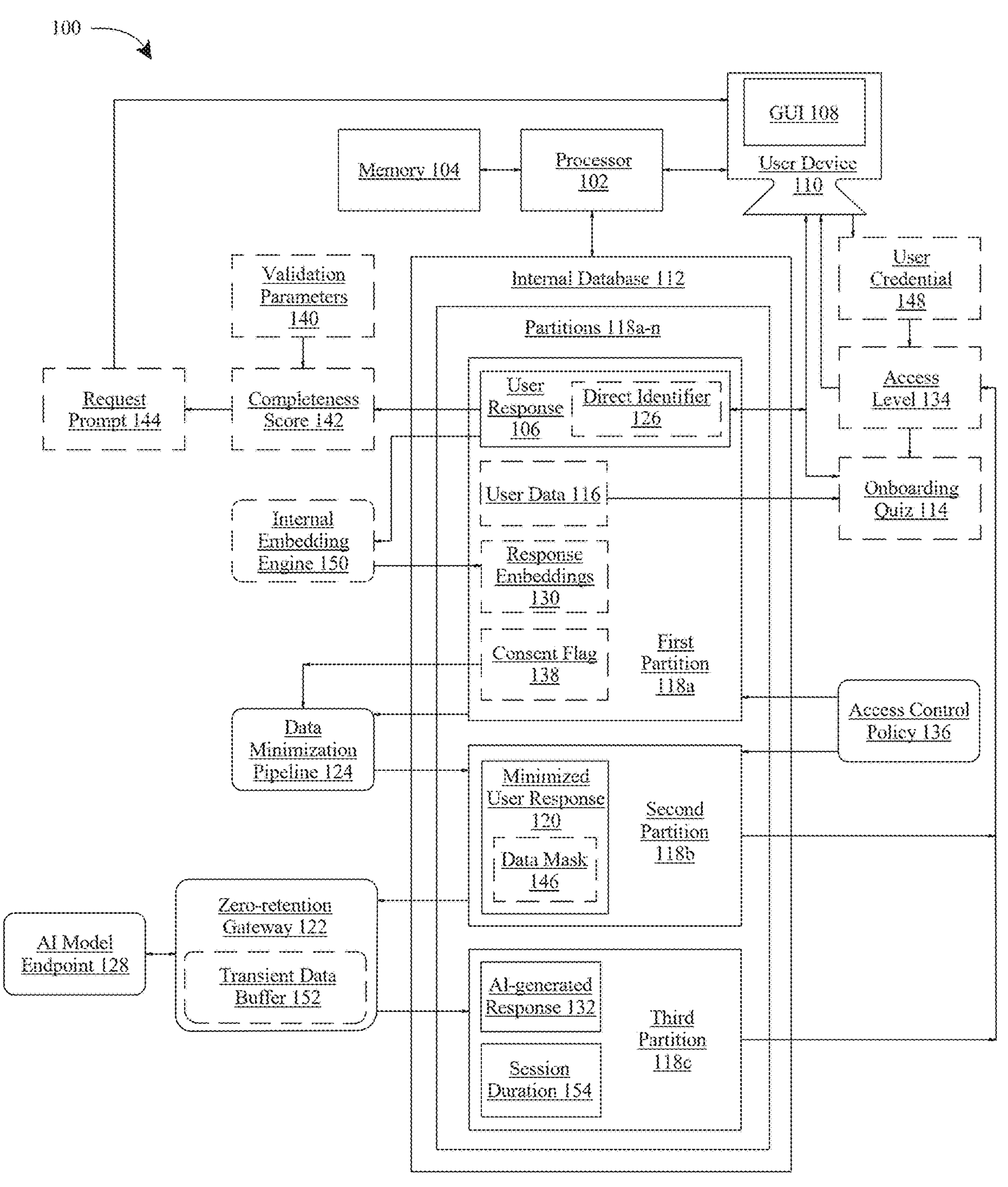
FIG. 1 illustrates a block diagram of an exemplary apparatus for secure data partitioning and zero-retention AI interaction.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses for and methods of secure data partitioning and zero-retention AI interaction. The apparatus includes at least a processor, and a memory communicatively connected to the at least a processor, wherein the memory contains instructions configuring the at least a processor to receive at least a user response from a graphical user interface, store the at least a user response within a first partition of a plurality of partitions of an internal database, execute a data minimization pipeline on the at least a stored user response to generate at least a minimized user response, wherein the at least a minimized user response is stored in a second partition of the internal database, wherein the second partition is isolated from the first partition by an access control policy, route, from the second partition, the at least a minimized user response to at least an AI model endpoint through a zero-retention gateway, receive an AI-generated response from the at least an AI model endpoint through the zero-retention gateway, wherein receiving the AI-generated response includes transiently storing the AI-generated response in a third partition of the internal database for a session duration, and modify the graphical user interface to include the AI-generated response retrieved from the third partition and associated data retrieved from at least one of the first partition and the second partition.

Later-life costs and risks often hinge on "real-life" factors (e.g., independence, socialization, ability to cook/drive) that advisors rarely capture. Getting this early helps prevent crises and makes guidance relevant. Better discovery also helps detect situations in which an individual may be particularly vulnerable to elder fraud and/or abuse.

Aspects of the present disclosure can also include a privacy posture in which quiz responses and derived embeddings can be stored only in the company's internal system and can be kept out of external model retention. Text that passes through an AI provider can pass through a zero retention path such as Bedrock, so prompts and generations can be transient at the provider and can remain unavailable for provider training or aggregation.

This can be implemented as a login quiz whose responses can flow into an internal database and internal vector store with access controls, while any model calls can route through a zero retention gateway so the provider can generate a response without retaining inputs or outputs. The pipeline can perform data minimization and may redact or tokenize direct identifiers before any request to a model endpoint. Professional view cards can read from the internal store in real time, and the retrieval layer can use only internal embeddings. A separate analytics service may run periodic jobs on de identified and aggregated records to produce internal inferences, a future longevity score, and research summaries, while consent flags and opt outs can govern what may be included.

Aspects of the disclosure can also provide for differentiated discovery and retrieval-augmented generation (RAG) onboarding. In some aspects, relevant data and/or results can be converted or transformed into embeddings in a RAG process for AI.

Exemplary embodiments illustrating aspects of the present disclosure are described below in the context of several specific examples.

Referring now to FIG. 1, an exemplary embodiment of apparatus 100 for secure data partitioning and zero-retention AI interaction is illustrated. Apparatus 100 may include circuitry such as without limitation a processor 102 communicatively connected to a memory 104; for instance, circuitry may include and/or be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 102 is configured to receive at least a user response 106 from a graphical user interface 108. For the purposes of this disclosure, a "user interface" is a means by which a user and a computer system interact. For example through the use of input devices and software. A user interface may include a graphical user interface (GUI) 108, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the user interface using a computing device distinct from and communicatively connected to at least a processor 102. For example, a smart phone, smart, tablet, or laptop operated by a user. In an embodiment, user interface may include a graphical user interface 108. A "graphical user interface," as used herein, is a graphical form of user interface that allows users to interact with electronic devices. In some embodiments, GUI 108 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run program, and the like because clicking on them yields instant access. Graphical user interface 108 may include interactive components such as text boxes, buttons, toggles, progress indicators, or adaptive forms. In some embodiments, graphical user interface 108 may be implemented as a web application, mobile application, or embedded client interface integrated into a secure enterprise portal.

With continued reference to FIG. 1, for the purposes of this disclosure, a "user response" is any structured, semi-structured, or unstructured data instance received from a user device 110 through the graphical user interface 108. In some embodiments, user response 106 may represent an explicit or implicit input provided by a user during an interactive session with apparatus 100. In some cases, user response 106 may be a primary input data object processed within the apparatus 100 for purposes including, without limitation, onboarding, personalization, inference routing, or secure storage within one or more partitions of the internal database 112. In some embodiments, a user response 106 may include one or more textual entries, numerical inputs, or categorical selections submitted in response to an onboarding quiz 114 or other interactive interface elements. For example, and without limitation, a user response 106 may include free-text answers to lifestyle questions ("I cook at home three times a week"), checkbox selections related to mobility or financial preferences, numerical fields (e.g., "Age: 72"), and multi-select dropdown responses for location or caregiving support. In other embodiments, a user response 106 may be derived from speech-to-text capture, gesture input, or data imported from a connected device or application, such as health tracker data, retirement portfolio summaries, or verified credential tokens.

With continued reference to FIG. 1, for the purposes of this disclosure, a "user device" is a physical or virtual computing system through which a user interacts with apparatus 100. The user device 110 may be communicatively connected to processor 102 and memory 104 of apparatus 100 through one or more secure communication channels and may be operable to execute client-side components of the graphical user interface 108 or associated event handlers. As a non-limiting example, user device 110 may include, without limitation, a laptop computer, desktop computer, tablet, smartphone, smartwatch, kiosk terminal, display console, or augmented-reality headset capable of transmitting or receiving structured or unstructured data. As a non-limiting example, a user device 110 may execute a browser-based interface that renders an onboarding quiz 114, captures user inputs as user responses 106, and transmits them to apparatus 100 over an encrypted network connection. For example, and without limitation, a user device 110 may operate as a mobile application configured to authenticate a user via biometric credentials, display quiz content locally, and synchronize responses to apparatus 100 upon reconnection to the network. In some embodiments, the user device 110 may include embedded sensors, microphones, or cameras for capturing multimodal user responses 106 such as spoken commands or gesture-based interactions, which apparatus 100 may interpret, process, and store within the internal database 112.

With continued reference to FIG. 1, for the purposes of this disclosure, a "user" is an individual, entity, or authorized representative that interacts with apparatus 100 through the graphical user interface 108 using a user device 110. In some embodiments, a user may include, without limitation, a client, a family member of a client, a vendor, a representative of a senior housing organization, a social worker, a member of a professional support network, a financial advisor, or other stakeholders participating in care coordination or financial discovery processes. As a non-limiting example, a user may be a client directly completing an onboarding quiz 114 through a web-based graphical user interface 108 displayed on a user device 110 such as a tablet or smartphone. For example, and without limitation, the client may input personal information (e.g., user data 116) and lifestyle responses that apparatus 100 stores within the first partition 118*a* of the internal database 112 for subsequent processing. In another non-limiting example, a family member acting on behalf of an elderly client may access apparatus 100 through a secured login, completing the same onboarding quiz 114 to provide data used in generating a minimized user response 120 stored in the second partition 118*b*. In some embodiments, a user may include professional caregivers or social service providers, such as social workers or senior housing coordinators, who utilize apparatus 100 to record assessments, update client records, or receive AI-generated recommendations through the zero-retention gateway 122. As a non-limiting example, a social worker may enter case details through the graphical user interface 108, where processor 102 executes a data minimization pipeline 124 to remove direct identifiers 126 before routing the minimized data to an AI model endpoint 128 for contextual evaluation. In some embodiments, a user may include financial advisors or professional support staff who interact with apparatus 100 as part of a structured client advisory workflow. For example, and without limitation, a financial advisor may log into apparatus 100 through a desktop user device 110 to review de-identified response embeddings 130 stored in the second partition 118*b* and retrieve relevant AI-generated responses 132 for integration into advisory reports or professional dashboards. The advisor's access level 134 may limit visibility to aggregated or anonymized records in compliance with the access control policy 136.

With continued reference to FIG. 1, apparatus 100 may support multi-role user participation while maintaining strict data segregation, privacy preservation, and partition-based access control. Each user, regardless of role or affiliation, interacts within a bounded security context that ensures data minimization, zero retention, and compliance with confidentiality policies while enabling collaborative engagement across family, professional, and organizational boundaries.

With continued reference to FIG. 1, in some embodiments, a user may interact with apparatus 100 across multiple devices or sessions. As a non-limiting example, a user may begin a quiz session on a smartphone and complete it on a laptop, where processor 102 retrieves the partially stored user response 106 from the internal database 112 using a session token or cross-session identifier. Apparatus 100 may maintain continuity by synchronizing user interface elements, preserving historical responses, and ensuring secure transmission of new data through encryption and session validation protocols.

With continued reference to FIG. 1, in some embodiments, each user response 106 may be associated with one or more metadata attributes including, without limitation, timestamps, session identifiers, consent flags 138, access levels 134, and validation parameters 140. These attributes may be stored alongside the user response 106 in the first partition 118*a* of the internal database 112 and may later guide the execution of the data minimization pipeline 124, determine eligibility for routing through the zero-retention gateway 122, and govern which aspects of the AI-generated response 132 are displayed to the user in the graphical user interface 108. In some cases, the user response 106 may include derived or implicit data collected through behavioral telemetry, such as time spent on a particular question, sequence of answer changes, or frequency of re-entries. These behavioral cues may be processed by processor 102 to generate a completeness score 142 or a confidence measure reflecting the consistency and reliability of the response. For instance, if a user rapidly selects inconsistent options, processor 102 may assign a lower completeness score 142 and generate a request prompt 144 to confirm or clarify the input before proceeding. In some embodiments, a user response 106 may include consent-aware distinctions that determine its handling across database partitions. For example, a response containing personal identifiers such as "My full name is John A. Miller" may trigger the data minimization pipeline 124 to extract and replace the direct identifier 126 using an appropriate data mask 146, whereas anonymized descriptive responses such as "I live in a rural area" may remain in the second partition 118*b* unaltered. In some embodiments, processor 102 may receive the user response 106 directly from a user device 110 executing the graphical user interface 108 locally. For example, when a user interacts with a desktop or mobile application running on the same physical device as apparatus 100, the user response 106 may be received through inter-process communication (IPC) channels, shared memory, or local socket connections.

In such implementations, the user response 106 may be transmitted to processor 102 immediately upon entry, such as when a user submits a form, selects an option, or completes an onboarding quiz 114 displayed in the graphical user interface 108. In other embodiments, processor 102 may receive the user response 106 remotely over a secure communication network. For example, and without limitation, the user device 110 may include a web browser, native application, or chat interface connected to apparatus 100 through encrypted communication protocols such as HTTPS, WebSocket, or secure gRPC. In such cases, processor 102 may detect incoming requests carrying the user response 106 within structured message bodies (e.g., JSON payloads, XML packets, or multipart form data) and parse the contents to extract field-level values for storage in the first partition 118*a* of the internal database 112.

With continued reference to FIG. 1, in some embodiments, processor 102 may receive user responses 106 from distributed endpoints within an enterprise environment. For instance, a remote advisor portal, an employee intake system, or a kiosk interface deployed in a healthcare or financial office may all act as upstream sources of user response data. Processor 102 may aggregate these responses via an internal message queue or API gateway, applying validation parameters 140 and authentication checks before storage. In some cases, processor 102 may receive a user response 106 through asynchronous channels. For example, a user may begin an onboarding quiz 114 on one device (e.g., a tablet) and complete it later on another device (e.g., a laptop). The apparatus 100 may retrieve the incomplete response from the first partition 118*a* using session identifiers or cross-session state variables and may merge the subsequent input upon reconnection, ensuring data continuity and session integrity. In certain implementations, processor 102 may receive implicit user responses 106 generated by background system actions or adaptive event handlers. For example, processor 102 may record inferred responses based on user activity, such as navigation patterns, skipped fields, or voice commands interpreted through speech-to-text modules, and incorporate those as part of the user response 106 dataset.

With continued reference to FIG. 1, for the purposes of this disclosure, "user data" is information associated with a user profile. User data 116 may include registration and credential information, prior responses to onboarding quizzes 114, stored consent flags 138, historical engagement data, and personalization preferences related to user role or service type. User data 116 may also capture contextual indicators relevant to social, medical, and financial well-being. For example, and without limitation, user data 116 may include anonymized attributes relating to living situation (e.g., living alone, with family, or in assisted living), communication patterns that indicate isolation risk, or documented events such as a recent relocation, hospitalization, or request for social services. Such contextual user data 116 are particularly relevant for financial advisors, who often encounter clients for the first time during a medical or care transition event ("My father just moved to assisted living, what do we do now?"). In such cases, user data 116 allow the apparatus 100 to generate proactive insights that connect financial planning with social and healthcare considerations, reducing missed opportunities for early intervention.

With continued reference to FIG. 1, for the purposes of this disclosure, an "onboarding quiz" is a sequence of prompts rendered through the graphical user interface 108 to collect situational, behavioral, and consent-related information from a user. The onboarding quiz 114 may be used not only for system setup but also for continuous contextual reassessment as user circumstances evolve. In some embodiments, processor 102 may dynamically generate onboarding quiz 114 content using one or more internal logic layers that reference retrieved user data 116 and determine what new information is required to refine the user's support profile. In some embodiments, the onboarding quiz 114 may include a structured series of contextually adaptive questions designed to capture key aspects of a user's daily life, health outlook, and social environment. The processor 102 may dynamically generate quiz content to assess not only factual information but also psychosocial indicators that are critical for later-life planning and care guidance. As a non-limiting example, the onboarding quiz 114 may include questions such as "What is your age?," "How often do you cook your own meals?," and "What is your current relationship status?," each of which provides insight into independence and support structures. Additional prompts may include "Do you have any ongoing medical conditions?," "How would you describe your current health outlook?," and "Are you currently retired or planning to retire soon?," allowing the system to infer health trajectories and financial readiness. In some embodiments, the onboarding quiz 114 may further include questions such as "Do you feel you have comprehensive coverage for future care needs?," "Who is most important to you?," "What do you enjoy about aging?," and "What do you wish your younger self knew about you?", each designed to surface emotional and relational context valuable for personalized recommendations. Questions may also probe for social connection, mental health, and isolation, such as by asking about the user's frequency of social interactions, perceived loneliness, or access to community support. As a non-limiting example, the onboarding quiz 114 may include prompts designed to assess risk of social isolation ("How often do you interact with family or friends each week?"), identify changes in living arrangements ("Have you or a family member recently moved into a senior living facility?"), or capture triggers for financial or care-planning intervention ("Has a recent medical event changed your or your client's care needs?"). In other embodiments, the onboarding quiz 114 may include compliance or privacy verification steps, such as requesting explicit consent flags 138 prior to collecting sensitive information, or adaptive branching that tailors subsequent questions to user type. For instance, a social worker may receive onboarding prompts focused on client social engagement, transportation access, and care coordination, while a financial advisor may receive prompts to capture family caregiving responsibilities or anticipated long-term care expenses. The graphical user interface 108 may render the onboarding quiz 114 using interactive input elements such as multiple-choice buttons, checkboxes, text entry fields, or slider bars, each linked to event handler graphics that record and validate user responses 106. The processor 102 may then associate validated responses with stored user data 116 for longitudinal analysis and future personalization.

With continued reference to FIG. 1, processor 102 may implement a template selection layer that indexes a library of question templates by topic (e.g., daily living activities, mobility, social engagement, transportation, cognitive cues), objective (e.g., risk screening, preference elicitation, benefit eligibility), disclosure tier (e.g., personal-only, professional-anonymized, community-aggregate), and prerequisite logic (e.g., "show if drives independently=yes"). As a non-limiting example, for a personal access level 134 the template selection layer may surface prompts such as "How often do you prepare meals independently?" or "In the past two weeks, how many days did you meet or speak with friends or family?," whereas for a professional access level 134 it may surface prompts such as "Has your client reported new transportation challenges in the last 30 days?" or "Are there observed changes in recurring healthcare or housing expenses?" For a community-facing role (e.g., senior-housing partner), the layer may surface aggregate prompts such as "Across your caseload, how many clients transitioned to assisted living this quarter?" while suppressing any template that would request direct identifiers.

With continued reference to FIG. 1, processor 102 may include a rule engine that assembles a quiz flow from the selected templates using branching conditions, skip logic, and completion criteria encoded as machine-readable rules. The rule engine may evaluate previously stored user responses 106 in the first partition 118*a* to avoid redundant questions, may reference minimized user responses stored in the second partition 118*b* to inform follow-ups without re-exposing direct identifiers, and may enforce access control policy 136 so that no prompt requests information outside the permitted scope. For example, and without limitation, if stored user data 116 indicates "no longer drives," subsequent transportation questions may pivot to "Which transportation options do you use (rideshare, community shuttle, family)?" rather than asking about driving frequency.

With continued reference to FIG. 1, in some embodiments, processor 102 may be configured to receive a user credential 148 from a user device 110, assign an access level 134 to the user device 110 as a function of the user credential 148 and selectively generate and present onboarding quiz 114 as a function of access level 134. For the purposes of this disclosure, a "user credential" is a structured authentication artifact transmitted from a user device 110 to verify the identity, affiliation, or authorization scope of a user. User credentials 148 may include, without limitation, encrypted login tokens, digital certificates, OAuth access keys, biometric hashes, or federated identity assertions issued by trusted domains. Each user credential 148 may contain one or more metadata fields such as user identifier, credential type, organizational role, and authentication confidence score. For the purposes of this disclosure, an "access level" is a tier that determines the degree of visibility, editability, and functional access a user or process has within the apparatus 100. Access levels 134 may be encoded as structured entries within an access-control registry stored in the internal database 112, each entry defining permissible data partitions, API endpoints, and graphical user interface (GUI) features available to that level.

With continued reference to FIG. 1, in some embodiments, processor 102 may assign an access level 134 by executing a multi-stage credential evaluation pipeline. First, the processor 102 may authenticate the user credential 148 using cryptographic verification or token exchange through an internal identity management subsystem. Once authentication is confirmed, processor 102 may extract credential metadata and evaluate it using a trained access classification model or rule-based classifier. For the purposes of this disclosure, an "access classifier" is a trained or rule-based computational module configured to categorize a user's role and associated privileges as a function of credential characteristics, behavioral context, or institutional affiliation. In some embodiments, the classifier may be implemented as a lightweight machine learning model trained on historical credential mappings, organizational role hierarchies, and consent logs. The classifier may analyze credential attributes (e.g., domain name, authentication source, token strength, session origin, or previous access pattern) and output a probability vector corresponding to one or more potential access levels. Processor 102 may then select the most probable or policy-compliant level from this distribution. As a non-limiting example, a credential authenticated under a verified healthcare provider domain (e.g., "provider-network") may yield a high confidence score for a professional access level, while a personal credential registered under an individual client's account may classify to a personal access level. A credential associated with a senior-housing organization or social-service portal may be classified as a community-access level, enabling read-only operations on anonymized regional summaries. In hybrid systems, the classifier may further reference user behavior patterns, such as frequency of logins, device type, or interaction modality, to refine access-level assignment dynamically. Once the access level 134 has been established, processor 102 may query an access-control policy table stored within the internal database 112 to confirm allowed data partitions and authorized operations. The resulting access-level profile may include permissible partitions (e.g., first partition for personal data, second partition for minimized data), allowable read/write privileges, and interface modules enabled for that user session.

With continued reference to FIG. 1, in some embodiments, processor 102 may then selectively generate and present an onboarding quiz 114 as a function of the assigned access level 134. The onboarding quiz 114 may be constructed through an adaptive question-selection engine referencing a question database, where each question template is tagged with metadata corresponding to the required access level and purpose category (e.g., personal discovery, compliance verification, or professional insight gathering). As a non-limiting example, a user classified as a personal-level client may receive questions related to lifestyle, independence, or emotional well-being ("How often do you participate in social or community activities?," "Do you require assistance with daily tasks?"). A professional-level financial advisor may instead receive context-verification questions ("Has your client's living arrangement or care status changed recently?," "Are you observing shifts in expense patterns associated with healthcare or housing?"). Similarly, a community-level social worker may receive aggregated survey prompts ("In your caseload, how many clients have transitioned to assisted living this quarter?"). In some embodiments, the classifier may continue to monitor the interaction stream and adjust the access level 134 in real time. For example, if processor 102 detects inconsistencies between credential attributes and behavioral indicators, such as a personal user attempting to query anonymized group data, the classifier may trigger a temporary downgrade in access privileges or request re-authentication.

With continued reference to FIG. 1, in some embodiments, processor 102 may be configured to determine a completeness score 142 for a user response 106 as a function of one or more validation parameters 140 and to generate and transmit a request prompt 144 to a user device 110 as a function of the completeness score 142. For the purposes of this disclosure, a "completeness score" is an indicator of how sufficiently a user response satisfies structural, semantic, and policy-specific requirements for downstream processing. For the purposes of this disclosure, "validation parameters" are machine-enforceable conditions that specify required fields, allowed ranges or categories, cross-field consistency rules, uncertainty thresholds, and privacy constraints. For the purposes of this disclosure, a "request prompt" is a system-generated message, question, or instruction that asks the user to clarify, expand, or confirm information in order to raise the completeness score to a target level.

With continued reference to FIG. 1, in some embodiments, processor 102 may compute the completeness score 142 using a layered evaluation pipeline that combines deterministic checks with a machine-learning model. As a non-limiting example, a first layer may apply rule-based validators (e.g., required-answer presence, range checks for numeric counts such as "social interactions per week," categorical validation for options such as "transportation mode," and date sanity checks). A second layer may apply a response-coherence model (e.g., a gradient-boosted tree or transformer-based classifier) that ingests engineered features derived from the user response 106, such as token counts, negation signals, contradiction cues across answers, and historical answer variance, and outputs a probability that the response is "actionable" for downstream use. Processor 102 may fuse these layers into the completeness score 142 by weighting rule compliance and model confidence (for instance, a convex combination of a normalized rule score and a model confidence logit). As a non-limiting example, if the user indicates "lives alone," "rarely leaves home," and "stopped driving," but omits any response about food access, the rule layer may flag a missing required field for daily living support and the model may infer elevated uncertainty due to a known risk profile; the fused completeness score 142 may drop below a predefined threshold, triggering a request prompt 144.

With continued reference to FIG. 1, in some embodiments, processor 102 may train the response-coherence model using historical interaction logs stored within the internal database 112, where each record includes a prior user response 106, the set of validation parameters 140 applied at the time, and a ground-truth adjudication label (e.g., "complete," "needs clarification: social," "needs clarification: mobility"). Training features may include lexical signals (n-grams, part-of-speech ratios), semantic features (contextual sentence embeddings), and structural features (form progression path, time-to-answer, edit count). For example, and without limitation, the model may learn that free-text answers shorter than a minimum token length with high negation frequency and missing correlated fields tend to be incomplete. In some embodiments, the model may incorporate conformal prediction or Monte Carlo dropout to estimate predictive uncertainty; when uncertainty exceeds a dynamic threshold encoded in the validation parameters 140, processor 102 may reduce the completeness score 142 accordingly and generate targeted follow-up prompts.

With continued reference to FIG. 1, the score machine-learning model may be configured to predict the degree of completeness of a user response 106 based on validation parameters 140 and contextual metadata. The score training data may include de-identified or synthetic historical onboarding responses, anonymized interaction logs, and expert-labeled examples that distinguish between complete, partial, and incomplete responses. Each record in the score training data may include an input feature vector comprising tokenized text of the response, rule-based validation signals (such as completeness of required fields, value ranges, or semantic coverage), and metadata such as response latency, edit frequency, or question type. Each record may also include a label or numerical rating representing the level of response completeness. Processor 102 may train the score machine-learning model using a supervised learning approach that minimizes the error between predicted completeness and labeled ground-truth values. The model may output a scalar completeness score between zero and one, where higher values indicate more complete responses, along with a confidence or uncertainty metric. For example, if a user enters "I live alone and have groceries delivered," the model may assign a completeness score of 0.92, reflecting sufficient contextual information. In some embodiments, a short response such as "I'm fine" may produce a score of 0.35, prompting processor 102 to generate a follow-up request prompt 144 such as "Would you like to share how often you talk with friends or family members?"

With continued reference to FIG. 1, the score machine-learning model may incorporate a transformer-based classifier that combines contextual embeddings from the embedding machine-learning model with deterministic validation features. During inference, processor 102 may feed the user response 106 and its metadata into the model, compute feature vectors, and produce the completeness score 142. In some embodiments, the model may also output a feature-importance map indicating which aspects of the response were deficient or missing. The model may be retrained periodically using newly labeled samples appended to the score training data through automated or expert review pipelines.

With continued reference to FIG. 1, in some embodiments, processor 102 may generate the request prompt 144 using a prompt-selection policy that maps a shortfall in completeness score 142 to one or more follow-up messages. As a non-limiting example, the policy may be implemented as a multi-armed bandit or reinforcement-learning agent that selects among several prompt phrasings or modalities (e.g., multiple choice vs. short answer) to maximize user completion likelihood while minimizing burden. The policy state may include the current completeness score 142, the specific validation parameters 140 that failed, the user's access level 134, and historical responsiveness patterns for the user device 110. For example, and without limitation, if a user frequently completes multiple-choice follow-ups but abandons free-text prompts, the policy may select a multiple-choice request prompt 144 such as "How do you usually get groceries? (family help/delivery/community program/other)." In some embodiments, processor 102 may condition the request prompt 144 on privacy context; if a missing field risks collecting a direct identifier 126, the prompt may instead ask for a category-level response that can be safely minimized downstream.

With continued reference to FIG. 1, in some embodiments, processor 102 may transmit the request prompt 144 to the user device 110 via the graphical user interface, and the event handler may apply inline validation to the returned user response 106. As a non-limiting example, when the user selects "community shuttle" for transportation and "once per month" for social activities, the completeness score 142 may recompute in real time and, if still below threshold, processor 102 may issue a tiered prompt such as "Would you like resources for local social programs?" followed by a constrained input control to capture the preferred contact method, without soliciting any direct identifier 126 in the interface itself.

With continued reference to FIG. 1, in some embodiments, processor 102 may be configured to generate, using an internal embedding engine 150, one or more response embeddings 130 corresponding to the user response 106. For the purposes of this disclosure, an "internal embedding engine" is a software module that converts textual or categorical content into fixed-length numerical vectors suitable for similarity search, clustering, and downstream retrieval. For the purposes of this disclosure, a "response embedding"

is a vector representation that encodes the semantic content of a user response in a continuous space. In some embodiments, the internal embedding engine 150 may implement a transformer encoder with mean or attention pooling over token embeddings, outputting unit-normalized vectors (e.g., 384- to 1024-dimension) that are stored in the second partition 118*b* alongside the minimized user response for privacy isolation.

With continued reference to FIG. 1, in some embodiments, processor 102 may train or fine-tune the internal embedding engine 150 on domain-specific corpora such as de-identified onboarding answers, professional annotations, and curated knowledge snippets describing later-life risks, social-connection indicators, or activities-of-daily-living cues. As a non-limiting example, a contrastive learning objective may pull together embeddings of semantically equivalent responses (e.g., "I rarely see friends" and "I'm mostly by myself") and push apart unrelated content, improving retrieval for retrieval-augmented generation paths while maintaining zero-retention boundaries. In some embodiments, the internal embedding engine 150 may support controlled masking, whereby tokens classified by the data minimization pipeline 124 as a direct identifier 126 are replaced with placeholder tokens before vectorization, ensuring the response embedding 130 does not leak sensitive attributes.

With continued reference to FIG. 1, in some embodiments, processor 102 may apply the response embeddings 130 in multiple technical paths. As a non-limiting example, nearest-neighbor search (e.g., cosine similarity over an approximate index such as hierarchical navigable small-world graphs) may retrieve internal guidance notes mapped to similar situations (e.g., isolation risk with limited transportation) to pre-populate access-appropriate content in the graphical user interface. As another example, clustering over response embeddings 130 may segment users into cohorts that drive adaptive validation parameters 140 (e.g., stricter checks when embeddings fall into a "high-risk ambiguity" cluster). In yet another example, the completeness-scoring model itself may accept the response embedding 130 as an input feature, enabling the model to recognize when semantically rich but brief responses are nonetheless "complete" for the current objective.

With continued reference to FIG. 1, processor 102 may also generate one or more response embeddings 130 using the embedding machine-learning model trained on embedding training data. The embedding training data may include a curated collection of de-identified onboarding responses, synthetic paraphrase pairs, and domain-specific text corpora representing social, financial, and healthcare scenarios relevant to advisor workflows. Each record in the embedding training data may include an input response and a target representation, either as a semantically equivalent response or as a labeled category vector (e.g., "mobility limitation," "social isolation," "financial dependency"). The embedding machine-learning model may be trained using contrastive or triplet-loss objectives to ensure semantically similar responses are encoded into proximate vectors in the embedding space.

With continued reference to FIG. 1, during runtime operation, processor 102 may preprocess a user response 106 to remove or mask direct identifiers through a data minimization pipeline 124 before tokenizing the text and feeding it into the embedding machine-learning model. The model may produce a fixed-length embedding vector that captures the semantic meaning of the response while preserving privacy. This vector may be stored in the second partition 118*b* or a transient inference cache for downstream operations. For instance, responses such as "I rarely leave home" and "I don't go out much anymore" may produce embeddings with high cosine similarity, allowing the processor 102 to classify them as equivalent expressions of social isolation without storing sensitive text.

With continued reference to FIG. 1, processor 102 may also employ a secondary classification mechanism trained on embedding training data to assign semantic categories to embeddings. For example, embeddings representing "I no longer drive" or "I need transportation help" may be mapped to the category "mobility assistance," while embeddings of "I feel lonely" or "I miss talking to my family" may map to "social isolation." The classifier's output may then serve as additional input to the score machine-learning model, allowing it to consider both explicit and inferred completeness factors.

With continued reference to FIG. 1, in some embodiments, processor 102 may integrate the completeness score 142 and the response embeddings 130 to orchestrate an iterative refinement loop. For example, and without limitation, if the response embedding 130 is close to a centroid representing "transportation barriers," but the current answers lack detail on grocery access, processor 102 may lower the completeness score 142 for that section and generate a targeted request prompt 144 offering a set of privacy-preserving options ("delivery," "family support," "community program") instead of free-form text, thereby accelerating completion while honoring the access control policy 136.

With continued reference to FIG. 1, processor 102 may orchestrate the score machine-learning model and embedding machine-learning model in a feedback-driven loop. In this configuration, embeddings produced from user responses 106 are used as input features for the completeness assessment. When the score falls below a predefined threshold, processor 102 may trigger a context-aware follow-up prompt generated by an auxiliary natural-language generation module. The clarified user response may then be re-embedded and re-evaluated, and both the original and revised responses may be anonymized and appended to the score training data and embedding training data for retraining. Over time, this feedback mechanism enables adaptive improvement of both models, enhancing their ability to interpret nuanced human responses while maintaining privacy through strict data partitioning and zero-retention constraints.

With continued reference to FIG. 1, processor 102 is configured to store the at least a user response 106 within a first partition 118*a* of a plurality of partitions 118*a-n* of an internal database 112. For the purposes of this disclosure, an "internal database" is a data management system configured to segregate data into multiple partitions with distinct access control policies. In some cases, internal database 112 may be under exclusive control of apparatus 100, implemented as a relational, document-oriented, or hybrid database. In some embodiments, processor 102 may be communicatively connected with internal database 112. For example, and without limitation, in some cases, internal database 112 may be local to processor 102. In another example, and without limitation, internal database 112 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store internal database 112. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, internal database 112 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, for the purposes of this disclosure, a "plurality of partitions" is isolated logical or physical data storage segments, each defined by a unique encryption key, schema, and access permissions. For the purposes of this disclosure, a "first partition" is a protected data store configured to retain unminimized or raw user responses 106 prior to anonymization or transformation. In some embodiments, processor 102 may apply encryption-at-rest and encryption-in-transit protocols, such as Advanced Encryption Standard (AES-256) and Transport Layer Security (TLS 1.3), to maintain data confidentiality during storage and retrieval. The internal database 112 may include a key management service to ensure that each partition maintains its own cryptographic boundary, preventing unauthorized data correlation across partitions.

With continued reference to FIG. 1, processor 102 is configured to execute a data minimization pipeline 124 on the at least a stored user response 106 to generate at least a minimized user response 120, wherein the minimized user response 120 is stored in a second partition **118*b* of the internal database 112, and wherein the second partition 118*b* is isolated from the first partition 118*a* by an access control policy 136. For the purposes of this disclosure, a "data minimization pipeline" is a sequential data-processing framework configured to reduce the amount of personally identifiable, confidential, or sensitive information contained in user responses 106 prior to transmission, model inference, or external processing. In some cases, the data minimization pipeline 124 may include a plurality of modules, such as entity recognition, identifier detection, redaction, pseudonymization, and tokenization modules, each configured to operate in series or parallel according to data classification policies. For the purposes of this disclosure, a "second partition" is an isolated data-storage region within the internal database that is designated for holding anonymized, transformed, or otherwise privacy-preserving derivatives of raw user data. The second partition may be segregated from the first partition 118*a*, which stores unprocessed or identifiable user responses 106, by an access control policy 136 configured to enforce strict compartmentalization of data. In some embodiments, the second partition 118*b* may be implemented using a dedicated database schema, a separate encrypted tablespace, a containerized storage module, a virtualized memory segment, or any combination thereof. The second partition 118*b* may, in some embodiments, include metadata fields labeling the source transformation method, timestamps, policy versions, or verification signatures associated with the minimization process. As a non-limiting example, whereas the first partition 118*a* may store an original user statement such as "My daughter Sarah helps me manage my finances," the second partition 118*b* may store the corresponding minimized user response 120 such as "A family member helps manage finances," ensuring that downstream access, such as routing to an AI model endpoint 128**, occurs only on privacy-preserving data.

With continued reference to FIG. 1, for the purposes of this disclosure, a "minimized user response" is a transformed representation of an original user response produced by the data minimization pipeline. In some cases, personally identifiable information, sensitive contextual details, or other data elements not essential to inference are redacted, tokenized, or replaced with abstracted equivalents in minimized user response 120. The minimized user response 120 may retain semantic meaning sufficient for AI model endpoint 128 operations while reducing exposure of sensitive information. For example, and without limitation, a user response 106 such as "I'm worried about paying for my father's assisted living care" may be transformed into a minimized user response 120 such as "Concern about paying for a relative's assisted living care," thereby removing the direct identifier while preserving analytical context. In some embodiments, processor 102 may store minimized user responses 120 exclusively within the second partition **118*b* of the internal database 112, subject to an access control policy 136** that isolates anonymized data from raw user inputs.

With continued reference to FIG. 1, in some embodiments, processor 102 may implement the data minimization pipeline 124 using a hybrid architecture combining deterministic rule-based logic with probabilistic, AI-based classification. For example, and without limitation, deterministic logic may use pattern-matching expressions to detect and remove numerical identifiers such as Social Security numbers, phone numbers, or account numbers, while AI-driven components may identify indirect identifiers such as references to relationships ("my daughter") or location clues ("in my assisted living facility") through semantic similarity modeling. As a non-limiting example, processor 102 may utilize an internal embedding engine 150 to compute vector representations of text spans in the user response 106 and compare them to pre-trained embeddings of sensitive data categories stored in the internal database 112. The data minimization pipeline 124 may then apply replacement logic such as substituting personal names with neutral placeholders or replacing identifiable institutions with general categories.

With continued reference to FIG. 1, in some embodiments, processor 102 may generate operational metadata for each executed minimization operation and record the metadata in a compliance partition of the internal database 112. This metadata may include a timestamp of processing, anonymization method identifiers, cryptographic hash values of masked fields, model version identifiers, and corresponding access policy references. Such metadata may allow apparatus 100 to reconstruct the transformation lineage of each minimized user response 120 for auditability while maintaining compliance with privacy standards. For example, and without limitation, when a user response 106 such as "I need help managing my father's healthcare plan" is received, the data minimization pipeline 124 may apply entity recognition and replacement logic to produce a minimized response such as "I need help managing a relative's healthcare plan," ensuring that familial relationships are retained semantically while removing explicit identifiers.

With continued reference to FIG. 1, processor 102 may perform regular integrity verification between the first partition 118*a* and second partition 118*b* using cryptographic hash comparison to confirm that each record in the second partition 118*b* corresponds only to its anonymized counterpart in the first partition 118*a* without cross-partition leakage. As a non-limiting example, a hash chain may be used to record linkage metadata across partitions for validation without exposing the original identifiers, thereby maintaining immutable proof of correspondence for compliance review.

With continued reference to FIG. 1, for the purposes of this disclosure, an "access control policy" is a programmatically enforced set of rules that governs which users, subsystems, and external endpoints may read, write, or modify data stored within each partition of the internal database 112. The access control policy 136 enforces logical and operational separation between the first partition 118*a* containing original user responses 106 and the second partition 118*b* containing minimized user responses 120. In some embodiments, the access control policy 136 may implement principles of least privilege and zero trust, ensuring that only authorized internal processes or microservices can access specific partitions.

With continued reference to FIG. 1, as a non-limiting example, the access control policy 136 may be implemented through a combination of role-based access control (RBAC) and attribute-based access control (ABAC) mechanisms integrated with an identity and access management (IAM) system. For example, a data minimization microservice may possess write-only access to the second partition 118*b*, while an AI-routing subsystem may possess read-only access, and neither system may access the first partition 118*a*. Similarly, human users such as analysts or advisors may be assigned access levels restricting them to de-identified or aggregated records derived from the second partition 118*b*.

With continued reference to FIG. 1, in some embodiments, the access control policy 136 may include cryptographically enforced session tokens, time-bound permissions, or token-based authorization tied to individual user credentials 148. Processor 102 may validate each access attempt by verifying a signed request against stored access policy rules, rejecting unauthorized operations. For example, and without limitation, an AI model endpoint 128 accessed through the zero-retention gateway 122 may receive only the minimized user response 120 without the ability to retrieve corresponding identifiers from the first partition 118*a*.

With continued reference to FIG. 1, processor 102 may be configured to execute a data minimization pipeline 124 that performs structured sanitization of incoming user responses 106 before routing any data beyond the internal database 112. During this process, the processor 102 may identify and extract one or more direct identifiers, such as personal names, addresses, phone numbers, email addresses, or other uniquely identifying textual elements, from the user response 106. Extraction may be performed using a layered detection mechanism combining pattern-based rules (e.g., regular expressions for phone numbers or email formats) and machine-learning entity recognition models trained on anonymized labeled datasets. These models may apply token-level classification to detect probable identifiers, even in unstructured sentences. For example, if the user response 106 contains "My daughter Sarah helps me with bills," the data minimization pipeline 124 may identify "Sarah" as a direct identifier. For the purposes of this disclosure, a "direct identifier" is any data element that can uniquely identify an individual. As a non-limiting example, direct identifier 126 may include a name, physical address, email address, social security number, phone number, or government-issued ID. Direct identifiers 126 may also include contextual personal descriptors such as "my son John," "our address at 14 Park Lane," or "my Medicare ID." The processor 102 may employ a language processing module configured to automatically detect and classify such identifiers within unstructured text input.

With continued reference to FIG. 1, once identifiers are extracted, the processor 102 may replace them using one or more data masks 146. A "data mask," for the purposes of this disclosure, is a context-preserving substitution that replaces sensitive terms with neutral or pseudonymous tokens. The pipeline may implement one of several masking strategies depending on system policy, such as deterministic tokenization (e.g., replacing "Sarah" with "[RELATIVE_1]") or reversible pseudonymization (e.g., applying a salted hash to preserve linkability across sessions). This ensures that subsequent analytics or AI routing operations can operate on contextually accurate yet privacy-safe data. As a non-limiting example, the same user response 106 after masking may read "My [RELATIVE_1] helps me with bills," where no identifiable entity remains.

With continued reference to FIG. 1, the language processing module may include a named-entity recognition (NER) component trained on de-identified linguistic corpora labeled for categories such as PERSON, LOCATION, ORGANIZATION, and CONTACT_INFO. The processor 102 may tokenize a user response 106, apply the language processing module to the token sequence, and compute probability distributions indicating whether each token corresponds to a direct identifier. The module may employ a hybrid detection approach, combining deterministic rules (for example, pattern-matching phone numbers or emails using regular expressions) and probabilistic models (such as a transformer-based classifier) that learn contextual relationships between words. As a non-limiting example, when the user response 106 is "My daughter Sarah helps me manage the bills," the model may identify "Sarah" as a PERSON entity and mark it as a direct identifier for masking.

With continued reference to FIG. 1, once direct identifiers 126 are identified, processor 102 may apply one or more data masks 146 to replace them with neutral or pseudonymized tokens while preserving grammatical coherence. For example, "Sarah" may be replaced with "[RELATIVE_1]" or "a family member," depending on the system's masking policy. These masking operations may be governed by user consent preferences stored in the first partition 118*a*.

With continued reference to FIG. 1, in some embodiments, the replacement of direct identifiers may be dynamically governed by a consent flag 138 retrieved from the first partition 118*a* of the internal database 112. For the purposes of this disclosure, a "consent flag" is an indicator that represents a user's authorization or opt-out preference regarding the processing, retention, or external transmission of their personal data. Each consent flag 138 may be set or modified through a graphical user interface 108 during onboarding or subsequent interactions. The processor 102 may retrieve the consent flag 138 during the data minimization pipeline 124 to determine the degree of anonymization required. If the consent flag 138 indicates "no external sharing," the processor 102 may apply full redaction, removing both direct and indirect identifiers. If the consent flag 138 indicates partial or internal-only consent, pseudonymization may be used to preserve analytical structure while ensuring no external exposure of identifiable information. The consent flag 138 May record a user's explicit preferences for how their data may be processed, stored, or transmitted. Processor 102 may read the consent flag 138 before applying any data mask 146. If the consent flag indicates that the user has withheld permission for personal data usage in model queries, the processor 102 may apply maximal masking, redacting all direct and indirect identifiers. In some embodiment, if the consent flag permits limited reuse under internal policy (for instance, internal-only pseudonymization), the processor 102 may select a lighter masking policy to retain analytical integrity while maintaining compliance. For example, and without limitation, when processing a response such as "I rely on John to drive me," the processor 102 may consult the consent flag 138: if the user opted out of identifiable data processing, the result may be "I rely on [CONTACT_1] to drive me," whereas if limited consent was granted, it may become "I rely on a friend to drive me." This context-sensitive masking ensures that privacy controls are individualized and technically enforced in real time.

With continued reference to FIG. 1, the zero-retention gateway 122 may operate as a transient, policy-controlled data transmission layer between the internal database 112 and one or more AI model endpoints 128. In some cases, zero-retention gateway 122 may include transient data buffer 152. For the purposes of this disclosure, a "transient data buffer" is a volatile memory allocation configured to temporarily hold data packets for the minimal period required to complete model inference or message routing. The transient data buffer 152 may be implemented in random-access memory (RAM) or a volatile cache and may employ encryption-at-rest during its short lifecycle. The processor 102 may assign a deletion schedule to the transient data buffer 152 governed by an expiration time threshold. For the purposes of this disclosure, an "expiration time threshold" is a temporal parameter specifying the maximum allowed duration for which data may reside in the transient data buffer 152. The expiration time threshold may be expressed in milliseconds, seconds, or as a dynamic variable based on system load, model latency, or policy compliance requirements. When the expiration time threshold elapses, the buffer's contents are programmatically overwritten and cryptographically shredded, ensuring non-recoverability of transmitted data. As a non-limiting example, the expiration time threshold may be configured to purge memory immediately after the processor 102 receives a successful completion signal from the AI model endpoint 128 or upon session termination. Zero-retention gateway 122 may include a transient data buffer 152 configured with an expiration time threshold that triggers automatic deletion of transmitted data after model inference is complete. The transient data buffer 152 may exist in volatile memory and may be encrypted both in transit and at rest during its short lifespan. Once the AI model endpoint 128 returns an inference result, the processor 102 may write the output to the third partition 118*c* for temporary storage while simultaneously triggering a timed deletion event for the buffer contents. As a non-limiting example, when a minimized user response 120 such as "I'm having trouble remembering my medications" is routed through the zero-retention gateway 122, zero-retention gateway 122 may hold the message for only the duration of model inference (e.g., less than one second). Upon receiving the AI-generated response 132, such as "Would you like to set a reminder for your medications?" the transient data buffer 152 may automatically purge the original message and the generated output from its memory. The buffer's expiration time threshold may be determined dynamically by a session policy, such as deleting the data after a successful acknowledgment signal from the receiving service or upon timeout expiration.

With continued reference to FIG. 1, this multi-layered approach, combining identifier masking governed by consent flags 138 and a zero-retention gateway 122 enforced through transient buffering, may provide end-to-end privacy assurance. Sensitive identifiers are removed at ingestion, access control is enforced throughout data flow, and any residual transient data is automatically destroyed post-inference. This may ensure that the apparatus 100 not only minimizes exposure risk but also technically enforces zero-retention compliance through immutable, time-bound memory operations integrated directly into the data pipeline.

With continued reference to FIG. 1, processor 102 is configured to route, from the second partition 118*b*, at least a minimized user response 120 to at least an AI model endpoint 128 through a zero-retention gateway 122. For the purposes of this disclosure, an "AI model endpoint" is an interface of an AI or machine-learning-model system configured to receive data inputs and generate corresponding inference outputs. As a non-limiting example, inference outputs may include text completions, embeddings, classifications, or predictions. In some embodiments, the AI model endpoint 128 may belong to an internal model hosted within apparatus 100. In some embodiments, the AI model endpoint 128 may belong to an external API provided by a third-party AI provider. In some cases, processor 102 may select a particular AI model endpoint 128 based on metadata of the minimized user response 120, such as content category, data sensitivity level, or computational requirements. As a non-limiting example, an AI model endpoint 128 may be a cloud-hosted or on-premise inference API configured to process natural language, structured data, or embeddings received from the internal embedding engine 150. For example, and without limitation, apparatus 100 may transmit a minimized user response 120 to an endpoint configured for natural language generation to produce contextual guidance, recommendations, or summaries that are returned in real time to the graphical user interface 108. The AI model endpoint 128 may include specialized sub-models for text interpretation, document summarization, question answering, or classification based on the nature of the minimized user response 120.

With continued reference to FIG. 1, in some embodiments, the AI model endpoint 128 may belong to an internal enterprise model service operated within a private network, ensuring that all computations occur within the organization's controlled infrastructure. In such configurations, apparatus 100 may access the endpoint through secure network calls and authenticate requests using token-based or role-based identity management defined under the access control policy 136. For example, and without limitation, the AI model endpoint 128 may perform contextual retrieval using internal vector stores to align the minimized user response 120 with relevant knowledge documents and generate domain-specific outputs without exposure to external providers.

With continued reference to FIG. 1, in another embodiment, the AI model endpoint 128 may correspond to a federated or hybrid inference gateway that allows apparatus 100 to dynamically route minimized user responses 120 to appropriate model types based on input characteristics. For example, and without limitation, a conversational reasoning model may handle free-text entries from clients or family members, while a structured inference model may process tabular records associated with care assessments or financial attributes. In another case, a sentiment or intent classification endpoint may evaluate the tone, urgency, or emotional cues in a user response 106 to prioritize advisor follow-up actions.

With continued reference to FIG. 1, the AI model endpoint 128 may be configured to return structured output objects, such as classification tags, recommendation scores, or extracted entities, rather than natural language text. Processor 102 may then merge these structured AI-generated responses 132 with data retrieved from the first partition 118*a* or second partition 118*b* before presenting them within the graphical user interface 108. As a non-limiting example, an AI model endpoint 128 may analyze a minimized user response 120 such as "I am worried about affording assisted living" and return structured indicators including "Financial Concern=High" and "Support Type=Housing," which apparatus 100 may display in a user dashboard or advisory workflow view.

With continued reference to FIG. 1, AI model endpoint 128 may include a large language model (LLM). A "large language model," as used in this disclosure, is a deep learning architecture configured to recognize, summarize, translate, predict, or generate text and other structured or unstructured content based on relationships learned from extensive datasets. In some embodiments, processor 102 may route a minimized user response 120 through a zero-retention gateway 122 to the AI model endpoint 128, where the LLM may perform contextual inference or text generation tasks. Training data for an LLM may include diverse and representative corpora drawn from text and structured datasets such as books, articles, technical documents, digital communications, transactional logs, or anonymized internal records. Such training enables the model to identify linguistic patterns and semantic relationships across multiple domains. In some embodiments, the LLM may include one or more neural architectures selected according to required inference capabilities, including but not limited to transformer-based, encoder-decoder, or autoregressive models.

With continued reference to FIG. 1, the LLM may be designed to operate as a stateless endpoint such that any input routed from the second partition 118*b* through the zero-retention gateway 122 is transient and not retained for further model training. The endpoint may apply text prediction algorithms that assign probability distributions to sequences of tokens within a minimized user response 120. As a non-limiting example, when a user input includes an incomplete expression such as "I want to understand my coverage options for," the LLM may generate a ranked distribution of potential continuations such as "long-term care," "insurance," or "prescription benefits," assigning likelihood values to each token. The LLM may then output the most probable or contextually consistent completion to the processor 102 for display in the graphical user interface 108.

With continued reference to FIG. 1, in some embodiments, the LLM may incorporate an attention mechanism that enables the model to focus selectively on relevant segments of input data. For the purposes of this disclosure, an "attention mechanism" is a neural component that dynamically weights relationships among tokens or feature representations to identify the most informative context for prediction. The attention mechanism may allow the LLM to overcome constraints of fixed-length encodings by enabling token-level associations across long sequences. In one example, the attention mechanism may calculate contextual vectors by assigning relative importance scores between tokens and aggregating weighted information before prediction. A "context vector," as used herein, refers to a dense vector representation of weighted input relationships useful for disambiguation and contextual understanding. The inclusion of attention mechanisms may allow the LLM to produce coherent responses even when user responses 106 include long, multi-sentence prompts describing complex circumstances, such as caregiving needs or financial planning constraints.

With continued reference to FIG. 1, the LLM may include a transformer architecture employing self-attention and positional encoding. The transformer architecture may process sequential text input in parallel, rather than one token at a time, increasing computational efficiency. For the purposes of this disclosure, "positional encoding" is a mathematical representation that assigns unique values to each token position within an input sequence, allowing the model to retain order information. In some embodiments, trigonometric encoding functions may be used to generate position vectors, and the resulting vectors may be concatenated with token embeddings before processing through attention layers. Each layer of the transformer architecture may include multi-head attention and feedforward sub-layers with residual connections and layer normalization to improve gradient stability during training and inference.

Still referring to FIG. 1, the multi-head attention layer of the LLM may decompose an input into multiple sub-spaces to allow simultaneous attention to different types of linguistic relationships. For example, and without limitation, one attention head may focus on grammatical structure while another identifies semantic similarity, enabling the model to detect complex dependencies such as "the caregiver who contacted the provider" versus "the provider who contacted the caregiver." Query, key, and value vectors may be computed for each token embedding, multiplied to produce attention scores, and normalized through a softmax operation. The outputs from each attention head may be concatenated and passed through a linear transformation to produce the final representation used for downstream decoding.

With continued reference to FIG. 1, decoder components of the LLM may include multiple stacked transformer layers configured for autoregressive generation. For the purposes of this disclosure, "autoregressive" refers to a process in which each predicted token is conditioned on previously generated tokens. The decoder may employ a look-ahead mask to prevent the model from attending to future positions within the same sequence, ensuring proper left-to-right generation. The output from each decoding layer may be passed through linear classification and softmax layers to compute probability distributions over the vocabulary. The token with the highest probability score may be selected as the next predicted output and appended to the generated sequence until an end-of-sequence token is reached.

With continued reference to FIG. 1, processor 102 may employ retrieval-augmented generation techniques to enhance the contextual grounding of LLM outputs. For the purposes of this disclosure, "retrieval-augmented generation" refers to a hybrid inference process that retrieves supporting information from structured or unstructured internal data sources before generating a response. In one embodiment, processor 102 may identify semantic keywords within a minimized user response 120, retrieve related embeddings from the internal database 112, and inject them into the LLM input sequence to reduce the likelihood of hallucinated content. For example, and without limitation, if a user response 106 concerns "long-term care coverage options," the processor 102 may retrieve policy metadata or anonymized plan attributes from the second partition 118*b* to inform the LLM's response.

Still referring to FIG. 1, processor 102 may implement similarity-based fetching as part of this retrieval process. A "similarity-based fetching" technique may convert a user query into a high-dimensional vector embedding and compare it with pre-computed embeddings of internal documents or records using cosine similarity or other distance metrics. The highest-scoring entries may be merged into the prompt context for the LLM, ensuring that AI-generated responses are specific to the organization's internal knowledge base. This architecture may ensure that private, non-minimized data in the first partition 118*a* remains inaccessible to the AI model endpoint 128 while still allowing contextually relevant inference.

With continued reference to FIG. 1, in some embodiments, the LLM may generate both textual and structured outputs. Textual output may include responses to user queries presented via the graphical user interface 108, while structured output may include key-value mappings, classification tags, or extracted entities for downstream analytics. As a non-limiting example, the LLM may classify a minimized user response 120 into predefined categories such as "financial planning," "healthcare coordination," or "social engagement," and transmit the classification result to the third partition 118*c* for temporary storage during the session duration 154. Processor 102 may then use the classification to modify the graphical user interface 108, generating a context-appropriate display card or recommended next step for the user.

With continued reference to FIG. 1, the LLM may be generally trained on broad datasets encompassing multiple domains and further fine-tuned on domain-specific corpora relevant to elder support, health management, or financial advisory interactions. General pretraining may use unsupervised learning over large textual corpora to learn language patterns, while domain-specific fine-tuning may be supervised using curated examples from compliant internal datasets. During fine-tuning, processor 102 may adjust model parameters to minimize a loss function representing the difference between predicted and expected responses. Hyperparameters such as learning rate, batch size, or regularization factors may be optimized to achieve stable convergence and task-specific performance. The fine-tuned model may thus serve as the primary inference component of the AI model endpoint 128.

With continued reference to FIG. 1, in some embodiments, LLM training data may include internally curated datasets comprising anonymized or synthetic records consistent with organizational privacy policy. Such training data may include correlations between structured attributes and corresponding natural language explanations. For example, and without limitation, a record indicating "consent_flag=false" may be paired with text stating "the user has opted out of data sharing," allowing the LLM to generate compliant language during response formation. In certain implementations, LLM training data may be iteratively refined using feedback loops in which AI-generated responses are reviewed, validated, and re-encoded into the internal database 112 for quality assurance. This iterative feedback process may improve both linguistic fluency and factual consistency without breaching data retention safeguards enforced by the zero-retention gateway 122.

With continued reference to FIG. 1, the architecture of AI model endpoint 128 may therefore enable contextual understanding and generative reasoning while preserving privacy through structural isolation, transient data routing, and partition-specific access control. The endpoint may serve as a dynamic inference node capable of providing guidance, explanation, or data summarization while ensuring that no original or identifiable information is ever exposed or retained beyond the session duration 154.

With continued reference to FIG. 1, for the purposes of this disclosure, a "zero-retention gateway" is a network-security intermediary configured to enforce a no-retention policy on transmitted data. For the purposes of this disclosure, the term "zero-retention" refers to an enforced operational constraint ensuring that no personally identifiable information, contextual metadata, or AI-generated response 132 remains stored in memory, cache, or logs after processing is completed. In some embodiments, the zero-retention gateway 122 may serve as an isolation boundary between the data minimization pipeline 124 and external or semi-external model endpoints. Zero-retention gateway 122 may ensure that only minimized user responses 120 from the second partition 118*b* are transmitted for inference, while access to the first partition 118*a* or any sensitive data fields is programmatically restricted under the access control policy 136. In certain embodiments, the zero-retention gateway 122 may apply runtime verification checks before releasing a payload for transmission. These checks may include validation that all direct identifiers and sensitive contextual tokens have been masked or removed according to the data minimization pipeline 124. Zero-retention gateway 122 may employ encryption-in-transit, ephemeral key generation, and one-time authorization tokens to prevent interception or replay of requests. As a non-limiting example, when a user device 110 submits a minimized user response 120, such as a summary of a care coordination request, the processor 102 may invoke the zero-retention gateway 122 to package the text payload, sign it with an ephemeral cryptographic key, transmit it to the AI model endpoint 128, and immediately destroy all local traces of the payload and key upon confirmation of successful response delivery.

With continued reference to FIG. 1, in some embodiments, zero-retention gateway 122 may implement a transient data buffer 152 configured with an expiration time threshold. For the purposes of this disclosure, a "transient data buffer" is a temporary memory allocation that stores data packets only for the duration required to complete inference at the AI model endpoint 128. Upon confirmation of model output receipt, the transient data buffer 152 automatically purges its contents through secure memory overwriting. In some embodiments, the zero-retention gateway 122 may employ ephemeral encryption keys that are generated per request and destroyed immediately after data deletion, ensuring that neither the gateway nor the AI model endpoint 128 retains retrievable plaintext or key material. As a non-limiting example, when a user response 106 collected from a graphical user interface 108 includes descriptive information about an individual's wellness goals, processor 102 may execute the data minimization pipeline 124 to redact personally identifiable details. The minimized user response 120, such as "user seeks assistance with increasing daily mobility," is then transmitted through zero-retention gateway 122 to an external AI model endpoint 128 hosted on a federated inference service. The transient data buffer 152 may hold this transmission only for milliseconds, after which all traces of the payload are erased once the AI-generated response 132 is returned.

With continued reference to FIG. 1, processor 102 may be configured to route at least a minimized user response 120 by selecting one of a plurality of AI model endpoints 128 as a function of the content and context of the minimized user response 120. The routing process may occur after the data minimization pipeline 124 has removed or masked any direct identifiers, ensuring that only sanitized, policy-compliant input is transmitted externally. Processor 102 may employ a routing logic layer that evaluates characteristics of the user response, such as detected topic, sentiment, or required model capability, and then matches it to an appropriate AI model endpoint 128. As a non-limiting example, a minimized user response 120 related to financial planning ("I'm concerned about covering healthcare costs after retirement") may be routed to an endpoint specialized in financial advisory reasoning, while a response concerning well-being or emotional state ("I feel isolated since moving to senior housing") may be directed to an endpoint optimized for empathetic language generation or wellness guidance. In some embodiments, the processor 102 may utilize a model selection classifier trained on routing training data comprising labeled examples of user responses and their optimal endpoint destinations. The classifier may analyze semantic embeddings generated by the internal embedding engine 150, evaluate response metadata such as sentiment or entity tags, and assign probability weights to each available endpoint. The processor 102 may then select the endpoint with the highest confidence score and transmit the minimized user response through the zero-retention gateway 122, ensuring that no residual data persists after inference completion. As a further non-limiting example, if a user response 106 references care planning ("My father's condition is worsening; what options do we have for assisted living?"), the processor 102 may route the response to an endpoint trained on eldercare and healthcare policy content. In some embodiment, if the user input relates to goal setting or positive engagement ("I want to find new hobbies to stay connected"), the processor 102 may select a conversational AI endpoint tuned for motivational dialogue. By aligning routing logic with the semantic and contextual properties of each minimized user response 120, the apparatus 100 ensures that each interaction is handled by the most suitable AI model endpoint 128 while maintaining strict compliance with privacy, retention, and access control constraints.

With continued reference to FIG. 1, processor 102 may be configured to route at least a minimized user response 120 by selecting one of a plurality of AI model endpoints 128 as a function of the content and context of the minimized user response 120. The routing process may occur after the data minimization pipeline 124 has removed or masked any direct identifiers, ensuring that only sanitized, policy-compliant input is transmitted externally. Processor 102 may employ a routing logic layer that evaluates characteristics of the user response, such as detected topic, sentiment, or required model capability, and then matches it to an appropriate AI model endpoint 128. As a non-limiting example, a minimized user response 120 related to financial planning ("I'm concerned about covering healthcare costs after retirement") may be routed to an endpoint specialized in financial advisory reasoning, while a response concerning well-being or emotional state ("I feel isolated since moving to senior housing") may be directed to an endpoint optimized for empathetic language generation or wellness guidance.

With continued reference to FIG. 1, in some embodiments, the processor 102 may utilize a model selection classifier trained on routing training data comprising labeled examples of user responses and their optimal endpoint destinations. The classifier may analyze semantic embeddings generated by the internal embedding engine 150, evaluate response metadata such as sentiment or entity tags, and assign probability weights to each available endpoint. The processor 102 may then select the endpoint with the highest confidence score and transmit the minimized user response through the zero-retention gateway 122, ensuring that no residual data persists after inference completion. The routing training data may include labeled examples of past user responses, each annotated with a target endpoint identifier representing the most effective or contextually appropriate model destination. The routing training data may be sourced from multiple internal and external repositories, including anonymized historical interactions stored in the internal database 112, performance logs from prior AI inferences, and curated domain-specific corpora such as financial advisement transcripts, senior care consultations, and wellness support dialogues. The routing classifier may be implemented as a machine-learning model trained on these labeled datasets to predict endpoint assignment as a supervised classification task. During training, input data may consist of vectorized response embeddings generated by the internal embedding engine 150, along with metadata features such as detected entities, sentiment polarity, or user access level. Each training instance may thus represent a multidimensional feature vector encoding both semantic and contextual information. The corresponding output label may identify one of several available endpoints, such as a financial advisory model, social support dialogue model, healthcare guidance model, or compliance verification model.

With continued reference to FIG. 1, at runtime, processor 102 may feed a newly received minimized user response 120 into the internal embedding engine 150 to compute a dense vector representation. This embedding may then be provided as input to the trained routing classifier, which outputs a ranked probability distribution across available endpoints. The processor 102 may select the endpoint associated with the highest confidence score and route the minimized user response 120 through the zero-retention gateway 122 to the corresponding AI model endpoint 128 for inference. For example, if the routing classifier detects linguistic patterns associated with emotional distress ("I've been feeling alone lately since moving to senior housing"), it may output a high confidence score for the "social engagement" endpoint. Alternatively, if the response includes financial concerns ("I'm worried about affording care after retirement"), the classifier may output a higher score for the "financial planning" endpoint. As a further non-limiting example, if a user response 106 references care planning ("My father's condition is worsening; what options do we have for assisted living?"), the processor 102 may route the response to an endpoint trained on eldercare and healthcare policy content.

In some embodiment, if the user input relates to goal setting or positive engagement ("I want to find new hobbies to stay connected"), the processor 102 may select a conversational AI endpoint tuned for motivational dialogue. By aligning routing logic with the semantic and contextual properties of each minimized user response 120, the apparatus 100 ensures that each interaction is handled by the most suitable AI model endpoint 128 while maintaining strict compliance with privacy, retention, and access control constraints.

With continued reference to FIG. 1, processor 102 is configured to receive the AI-generated response 132 from the at least an AI model endpoint 128 through the zero-retention gateway 122, wherein receiving the AI-generated response 132 comprises transiently storing the AI-generated response 132 in a third partition 118*c* of the internal database 112 for a session duration 154. "Transiently storing," for the purposes of this disclosure, refers to the temporary retention of data in volatile or short-term memory structures for the purpose of enabling active computation, processing, or communication within the apparatus 100. Transiently stored data are not written to persistent or long-term storage media (such as databases, file systems, or non-volatile memory) and are automatically deleted, deallocated, or overwritten after the completion of the immediate task or session in which they were created. In some embodiments, transiently storing may include writing data to an in-memory cache, session buffer, or temporary register within processor 102, memory 104, or the third partition 118*c*. Such data may exist only for the operational duration of an inference request, data transformation, or graphical user interface update. Once the associated process concludes or the session duration expires, the data are purged using techniques such as memory zeroization, volatile cache flushing, or ephemeral session teardown.

With continued reference to FIG. 1, for the purposes of this disclosure, an "AI-generated response" is a machine-generated output derived from the AI model endpoint 128. In some cases, AI-generated response 132 may be configured to deliver relevant, compliant, and contextually tailored information to the graphical user interface 108 without including any direct identifiers, sensitive attributes, or data from the first partition 118*a*. In some embodiments, the AI-generated response 132 may include one or more of a natural-language text output suitable for display to a user via the graphical user interface 108, a structured data object or JSON payload containing inferred metadata, classifications, or validation parameters 140, and a hybrid response combining text and data suitable for automated downstream processing within the apparatus 100. The format of the AI-generated response 132 may be determined by the processor 102 based on the originating request prompt 144 and the access level 134 of the user. For example, and without limitation, when a user response 106 includes a minimized statement such as "I want to help my father find senior housing options," the AI-generated response 132 may output text such as "Here are some senior housing resources available in your area," accompanied by a structured table of facilities and contact information accessible under the user's consent flag 138. In another embodiment, if a user query relates to a financial planning concern, e.g., "How can I estimate my retirement income?," the AI-generated response 132 may provide an explanatory summary derived from internal financial policy datasets, followed by computed estimates or references to applicable programs, while ensuring no personal data is retained beyond the session duration 154.

With continued reference to FIG. 1, the AI-generated response 132 may include supplementary reasoning or validation elements. For instance, processor 102 may compare the LLM's output embeddings against internal reference embeddings to calculate a completeness score 142 or verify alignment with defined validation parameters 140. If the AI-generated response 132 does not meet confidence or compliance thresholds, processor 102 may trigger a regeneration or flag the result for human review. As a non-limiting example, the AI-generated response 132 may take the form of an anonymized care coordination summary, such as: "The client is seeking assistance with daily living support. Recommended next step: connect to a licensed social worker for assessment." The corresponding structured data may encode this recommendation as key-value pairs for downstream routing within the data minimization pipeline 124. In certain embodiments, the AI-generated response 132 may include adaptive recommendations dynamically personalized to the user's access level 134 or device context. For example, a social worker accessing the apparatus 100 through an authorized user device 110 may receive detailed procedural guidance, whereas a family member of the client may receive simplified summaries or contact options. Regardless of form, the AI-generated response 132 is generated, transmitted, and displayed in compliance with privacy-preserving rules enforced by the zero-retention gateway 122 and access control policy 136, ensuring that no retained copy of either the prompt or the generated content persists after session termination.

With continued reference to FIG. 1, for the purposes of this disclosure, a "third partition" is a transient, session-scoped data store configured to temporarily retain operational artifacts associated with user interactions, AI-generated responses 132, and other short-lived contextual data. The third partition 118*c* may be logically and physically isolated from both the first partition 118*a* and the second partition 118*b*, ensuring that no cross-partition joins, identifier propagation, or unintended persistence occurs. Processor 102 may instantiate the third partition 118*c* dynamically at the initiation of a user session and may automatically destroy its contents once the session duration 154 expires or upon explicit user termination. For the purposes of this disclosure, a "session duration" is a predefined temporal window during which ephemeral data are retained to maintain continuity of experience. As a non-limiting example, session duration 154 may include active period of a user's interaction with the graphical user interface 108. In some embodiments, the session duration 154 may correspond to a browser session, mobile application window, or authenticated API session, typically ranging from several minutes to several hours. At the conclusion of this interval, processor 102 may trigger an automatic deletion sequence that performs cryptographic overwriting, memory deallocation, and cache invalidation to ensure irreversible erasure of all data stored in the third partition 118*c*. In some embodiments, the third partition 118*c* may be used to temporarily store AI-generated responses 132, derived response embeddings 130, validation parameters 140, and intermediate computations that facilitate dynamic updates to the graphical user interface 108. For example, and without limitation, when a user device 110 requests personalized recommendations through the apparatus 100, processor 102 may route the minimized user response 120 to the AI model endpoint 128 and temporarily store the AI-generated response 132, such as "Based on your input, here are three recommended care programs," within the third partition 118*c*. This response may remain accessible for the duration of the user's active session, allowing the user to navigate, expand, or refine results in real time. Upon session expiration, all related response data are securely deleted to prevent any retention of personally or contextually sensitive information. As a further non-limiting example, during an onboarding quiz or eligibility assessment, processor 102 may generate transient fields within the third partition 118*c* to store validation states, consent flag 138 statuses, or completeness score 142 values used for guiding the user through successive steps. These temporary records may help maintain continuity within a session but are not written back to the internal database 112 after the session duration 154 lapses. In certain embodiments, the third partition 118*c* may also include a transient data buffer 152 used to hold temporary analytics, interface states, or runtime parameters. The transient data buffer 152 may facilitate asynchronous updates between the graphical user interface 108 and backend systems, such as preserving user navigation history or pending message states, without committing any persistent copy to long-term storage.

With continued reference to FIG. 1, in some embodiments, processor 102 may associate each AI-generated response 132 with a cryptographic hash or unique session token to ensure linkage integrity during display and retrieval. Once the session duration expires, apparatus 100 may execute an automated cleanup routine to remove entries from the third partition 118*c* and to invalidate any transient session tokens. In certain cases, apparatus 100 may optionally archive non-sensitive session metadata, such as response latency, model endpoint identifier, or anonymized interaction metrics, for internal performance monitoring, while ensuring no retention of actual AI-generated content.

With continued reference to FIG. 1, processor 102 is configured to modify the graphical user interface 108 to include the AI-generated response 132 retrieved from the third partition 118*c* and associated data retrieved from at least one of the first partition 118*a* and the second partition 118*b*. In some embodiments, processor 102 may execute a rendering engine or interface orchestration layer that synchronizes data across partitions. The AI-generated response 132, which is temporarily retained in the third partition 118*c*, may include formatted natural-language text, structured elements (e.g., JSON objects or tables), or multimedia cues. The rendering engine may parse this data and embed it into the GUI 108 alongside associated contextual information retrieved from the first and second partitions. For instance, the first partition 118*a* may provide baseline user profile information or persistent configuration parameters (e.g., consent flags, accessibility settings, or prior interaction summaries). The second partition 118*b*, containing minimized or anonymized user data, may contribute context such as categorical user needs, service eligibility, or anonymized demographic indicators. The third partition 118*c* contributes the AI-generated response 132 and ephemeral session data, which may include confidence scores, response timestamps, or routing metadata. Processor 102 may merge these data streams to produce a cohesive, interactive display while maintaining strict separation between raw identifiers and anonymized or session-level data. As a non-limiting example, if a user engages the apparatus 100 through a tablet device to request assistance with senior housing options, processor 102 may retrieve the AI-generated response 132 ("Here are three nearby assisted-living facilities that match your criteria") from the third partition 118*c*. Concurrently, processor 102 may retrieve the user's preapproved search radius and anonymized location preferences from the second partition 118*b*. These combined data are rendered on the GUI 108 as an interactive card interface displaying facility names, approximate distances, and non-identifiable contact links, all while ensuring that sensitive data from the first partition 118*a* (e.g., user name or address) remain inaccessible to the displayed layer. In another example, when a financial advisor uses the apparatus 100 to view a client's anonymized financial summary, processor 102 may display AI-generated explanations of spending categories (from the third partition 118*c*) alongside stored transaction trends (from the second partition 118*b*). However, the advisor-facing GUI 108 may exclude raw transaction identifiers or personal account numbers stored in the first partition 118*a*.

With continued reference to FIG. 1, in some embodiments, processor 102 may employ a contextual rendering policy to determine which elements from each partition are eligible for display based on user role and access control policy 136. For example, a social worker logged in through an authorized account may view anonymized client progress metrics and AI-generated summaries, whereas a family member user may view only simplified recommendations or next-step guidance. In further embodiments, processor 102 may utilize event-driven updates to modify the GUI 108 in real time. For instance, when the AI-generated response 132 updates during inference or when a user modifies input parameters, the GUI 108 may refresh automatically without reloading the entire interface. This is achieved through transient data bindings to the third partition 118*c*, which allow session-specific values to be reflected in the interface and subsequently erased upon session termination.

With continued reference to FIG. 1, processor 102 may be configured to selectively modify the graphical user interface 108 as a function of an access level 134 assigned to a user device 110. The modification logic may dynamically determine which visual elements, data partitions, and interactive components are rendered based on the user's classification, ensuring that only authorized data and features are exposed during operation. In response to a first access level, processor 102 may modify the graphical user interface 108 to include data retrieved exclusively from the first partition 118*a*, which may contain user-provided responses, general configuration data, or non-sensitive contextual content. For example, and without limitation, a user device 110 associated with a standard user or client may display recent activity summaries, anonymized insights, or interactive onboarding quizzes 114 drawn from the first partition 118*a*, while being prevented from viewing or modifying any minimized or transformed data. In response to a second access level, processor 102 may modify the graphical user interface 108 to comprise data retrieved from the second partition 118*b*. The second partition 118*b* may contain minimized or anonymized versions of user data 116 generated by the data minimization pipeline 124. In this case, processor 102 may enable interface components that render analytical summaries, trend metrics, or AI-interpreted insights derived from de-identified data, without revealing any direct identifiers. For example, and without limitation, a user with elevated privileges, such as a financial advisor or compliance analyst, may access graphical summaries of risk indicators or social well-being scores computed from the minimized user responses 120, while the underlying personally identifiable text remains inaccessible.

With continued reference to FIG. 1, the processor 102 may perform selective graphical modifications using a role-based rendering engine that references an access control policy 136 stored in memory 104. During runtime, the access level 134 may be communicated from an authentication service through a secure token that encodes role attributes (e.g., "client_user," "advisor_user," or "admin").

Processor 102 may parse the token and apply a conditional rendering pipeline that determines which data-binding endpoints and interface components are activated. The rendering engine may then instantiate user interface elements dynamically through templates stored in memory 104, ensuring visual consistency while maintaining strict data isolation. For instance, upon identifying a second access level, the processor 102 may enable additional data visualization components showing aggregated demographic trends or anonymized behavioral patterns derived from the second partition 118*b*. In some embodiments, for a first access level, the same region of the interface may instead display personal onboarding progress, consent status, or next-step instructions. In some embodiments, the selective modification process may be further governed by contextual triggers detected through event handlers linked to the graphical user interface 108. These event handlers may relay interaction data to the processor 102, which may in turn determine whether an interface element should update or refresh as a function of the user's access level and session state. For example, when a financial advisor logs into the system, processor 102 may detect a high-tier access token and update the user interface to include aggregate "client insight" dashboards populated using de-identified data from the second partition 118*b*. In contrast, when a client logs in, the event handler may restrict access to personal onboarding modules sourced only from the first partition 118*a*, ensuring compliance with the system's data minimization and access control requirements.

With continued reference to FIG. 1, this selective interface modification may enable the apparatus 100 to maintain strict separation between personal user data and analytical data while providing role-appropriate functionality. By leveraging partition-aware rendering logic, the system ensures that each user's visual experience reflects their access privileges and operational role, thereby maintaining compliance, minimizing risk of data leakage, and optimizing usability across both client-facing and professional-facing workflows.

In some embodiments, the disclosure disclosed herein provides a technical solution to the technical problem of securely managing and processing user-provided data during AI-assisted interactions while preventing unauthorized data retention and cross-partition exposure. The described apparatus 100, through its partitioned internal database 112, zero-retention gateway 122, and data minimization pipeline 124, introduces a computing architecture that isolates sensitive data, enforces real-time access control, and ensures transient handling of AI-generated responses 132. By configuring processor 102 to perform data minimization before model inference and by routing minimized user responses 120 through a zero-retention gateway 122, the system, advantageously, achieves enhanced data privacy and compliance with retention policies without degrading computational efficiency or user experience. In some embodiments, the described system further enables secure multi-session continuity through cross-partition data retrieval while preserving privacy guarantees. Accordingly, and beneficially, embodiments disclosed herein provide an improved technical framework for controlled AI interaction, optimized for privacy, auditability, and operational scalability within data-sensitive environments.

Figure 2A:
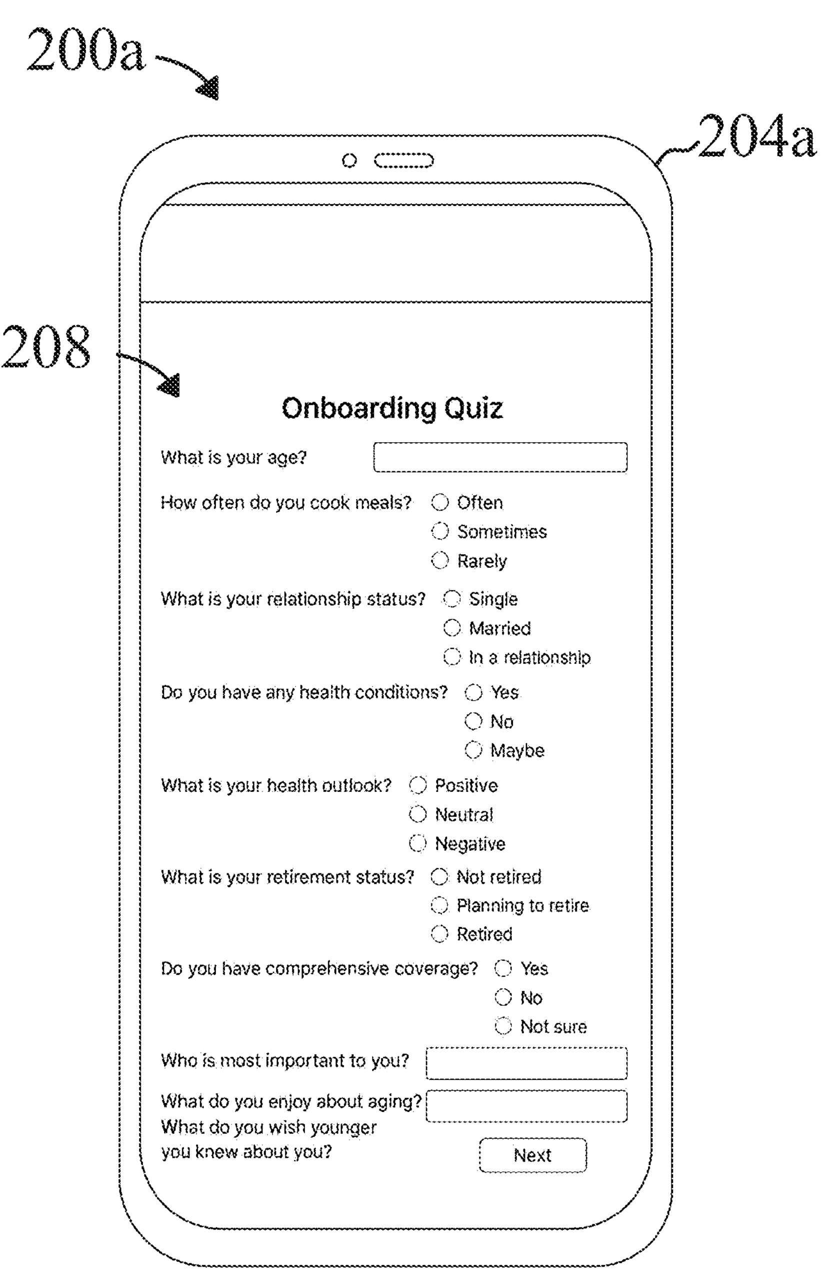
FIGS. 2A-B illustrate exemplary user interfaces.
Figure 2B:
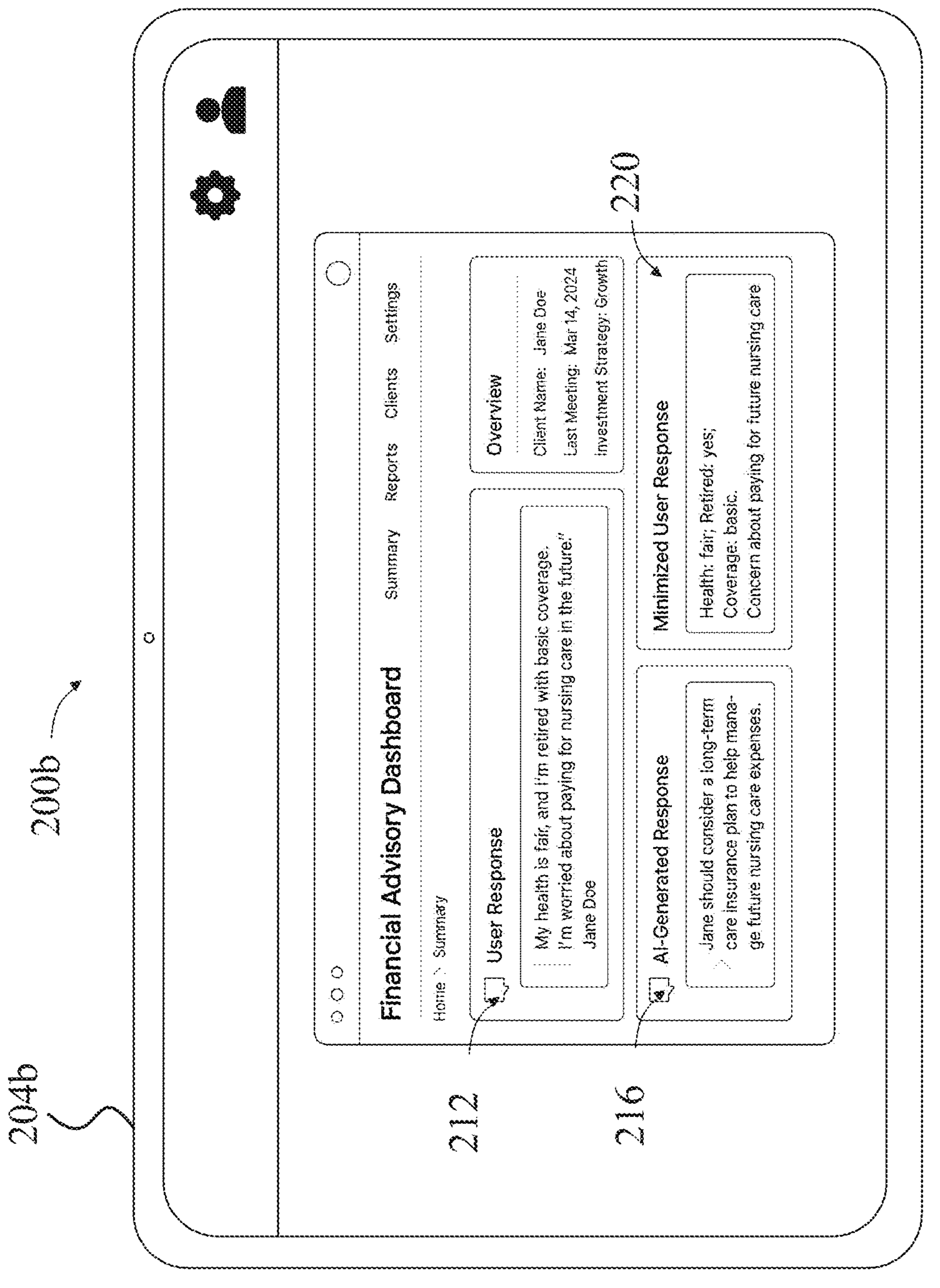

Referring now to FIGS. 2A-B, exemplary user interfaces 200*a-b* are illustrated. In some embodiments, user interface 200*a* may be displayed on a user device 204*a* and may include onboarding quiz interface 208 configured to collect user responses through a sequence of dynamic prompts. As depicted, onboarding quiz interface 208 may render questions corresponding to contextual factors such as age, relationship status, health outlook, retirement status, or social engagement habits. Each prompt may be associated with selectable options, text entry fields, or event handler elements configured to transmit user responses to processor for further processing.

With continued reference to FIG. 2B, user interface 200*b* may represent a professional or administrative dashboard rendered on a user device 204*b*. In the illustrated embodiment, user interface 200*b* may include multiple interface regions or panes displaying data derived from the internal database. User response pane 212 may present a retrieved user response captured from onboarding quiz interface 208 or another session, while AI-generated response pane 216 may display an AI-generated response produced by processor in communication with one or more AI model endpoints through a zero-retention gateway. The AI-generated response may provide contextually relevant insights, such as recommendations or action prompts based on the analyzed user data. Adjacent to these, minimized user response pane 220 may present the minimized user response, which may correspond to a data-minimized and privacy-preserving representation of the original user input, generated by the data minimization pipeline. In some embodiments, processor may update user interface 200*b* dynamically by retrieving data from the first partition, second partition, and third partition of the internal database, as appropriate to the user's access level and active session context. For example, and without limitation, user device 204*b* may display only anonymized or minimized data to a professional advisor while retaining sensitive or personally identifiable content in a restricted-access partition. The illustrated layout thus enables a clear separation between original user responses, AI-generated responses, and minimized user responses, allowing the apparatus to maintain secure data handling while supporting real-time analytics and interactive visualization through the graphical user interface.

Figure 3:
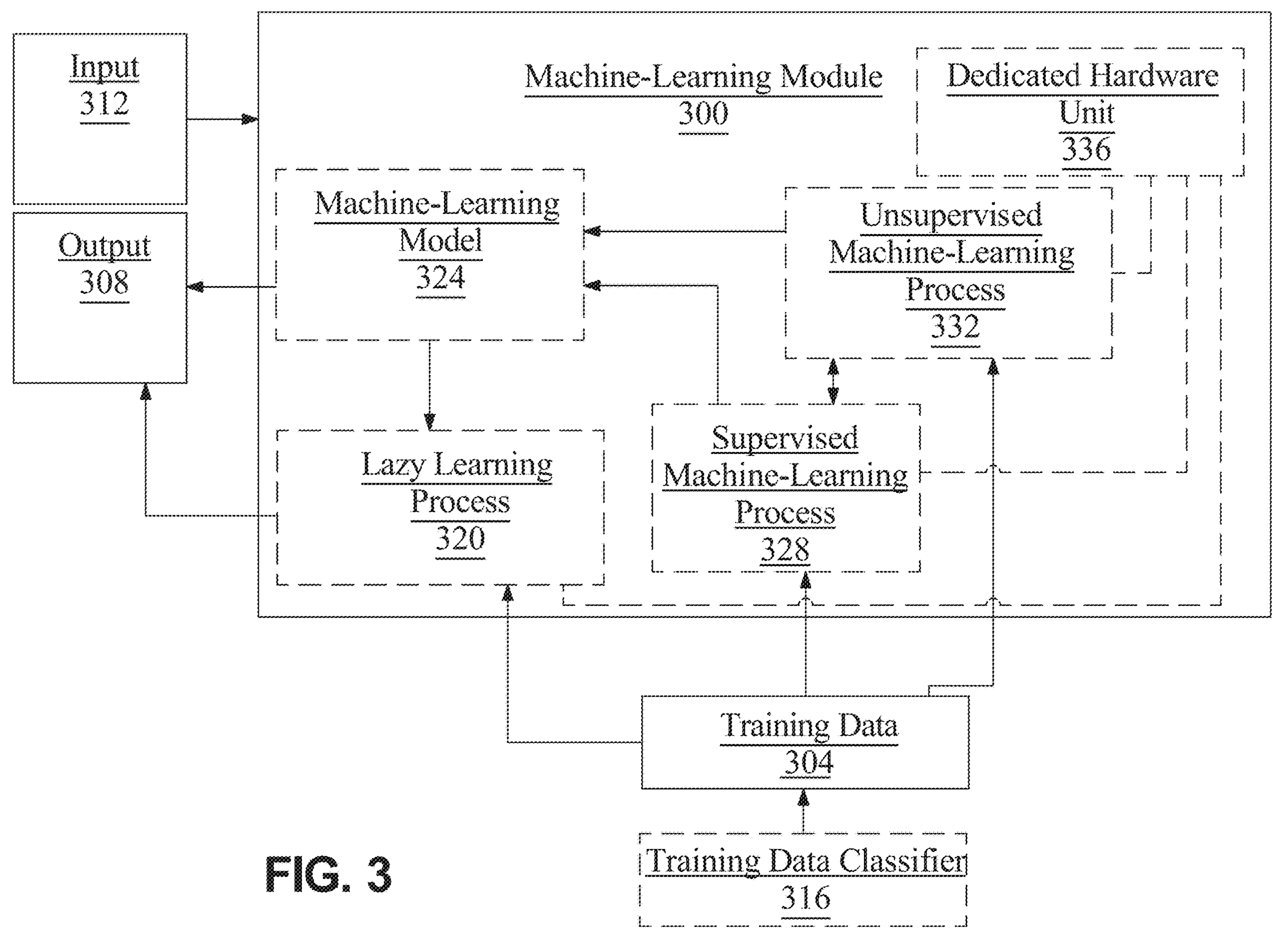
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include user response, minimized user response, access control policy, user data, user credential, access level, completeness score, request embeddings, direct identifier, consent flag, and the like. As a non-limiting illustrative example, output data may include minimized user response, access level, completeness score, direct identifier, AI-generated response, onboarding quiz, request prompt, response embeddings, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to identify and label sub-populations or cohorts of users, responses, or behavioral patterns that share common statistical or semantic attributes, such as a cohort of users exhibiting similar engagement trends, consent preferences, or health and financial planning characteristics. As a non-limiting example, training data classifier 316 may classify elements of training data to user cohorts related to user's demographic, such as age, gender, occupation, health condition, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new}=\frac{X-X_{min}}{X_{max}-X_{min}}.$$

Feature scaling may include mean normalization, which involves use of a mean value of a set and/or subset of values, $X_{mean}$ with maximum and minimum values:

$$X_{new}=\frac{X-X_{mean}}{X_{max}-X_{min}}.$$

Feature scaling may include standardization, where a difference between X and $X_{mean}$ is divided by a standard deviation σ of a set or subset of values:

$$X_{new}=\frac{X-X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new}=\frac{X-X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user response, minimized user response, access control policy, user data, user credential, access level, completeness score, request embeddings, direct identifier, consent flag, and the like as described above as inputs, minimized user response, access level, completeness score, direct identifier, AI-generated response, onboarding quiz, request prompt, response embeddings, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
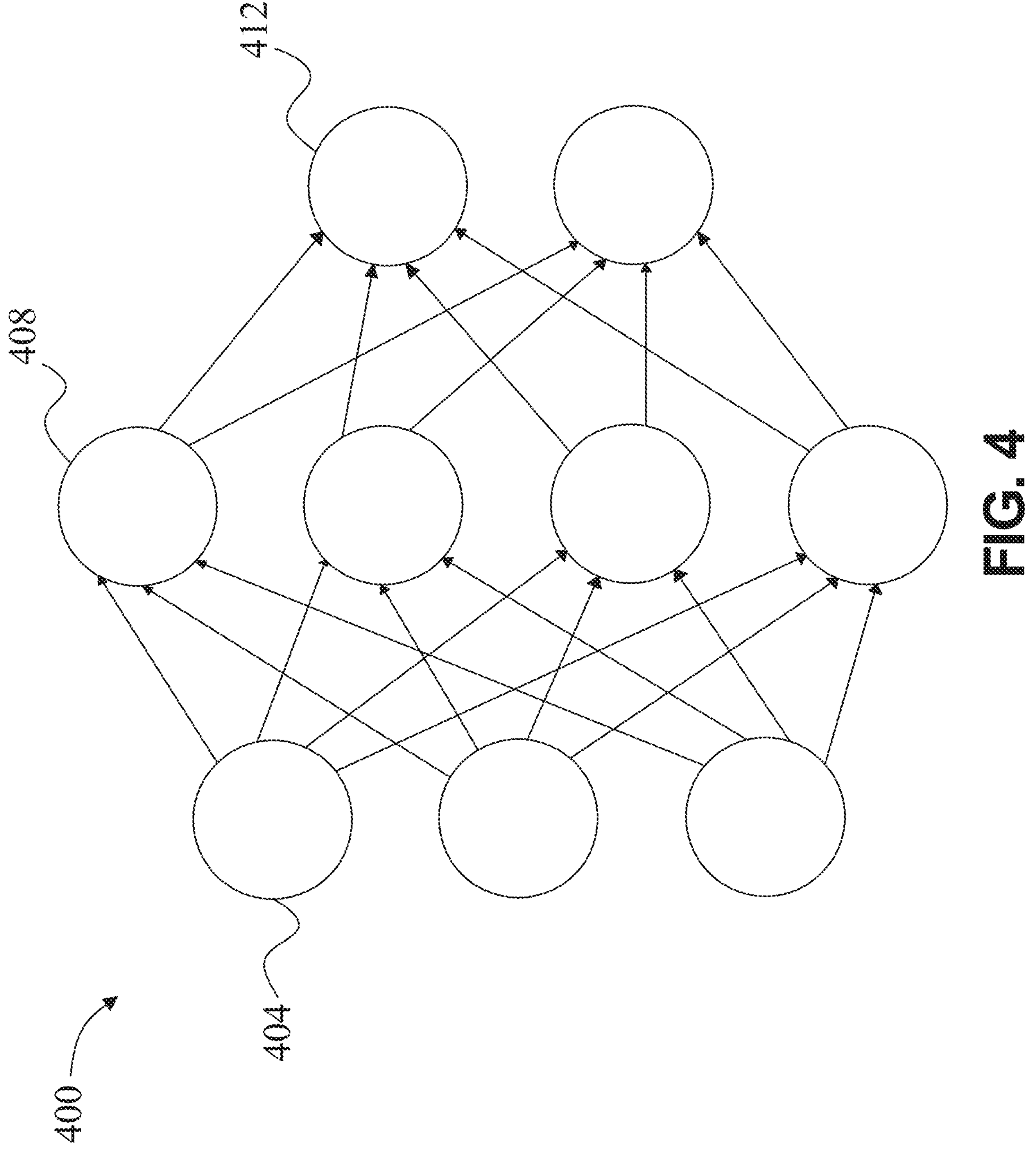
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
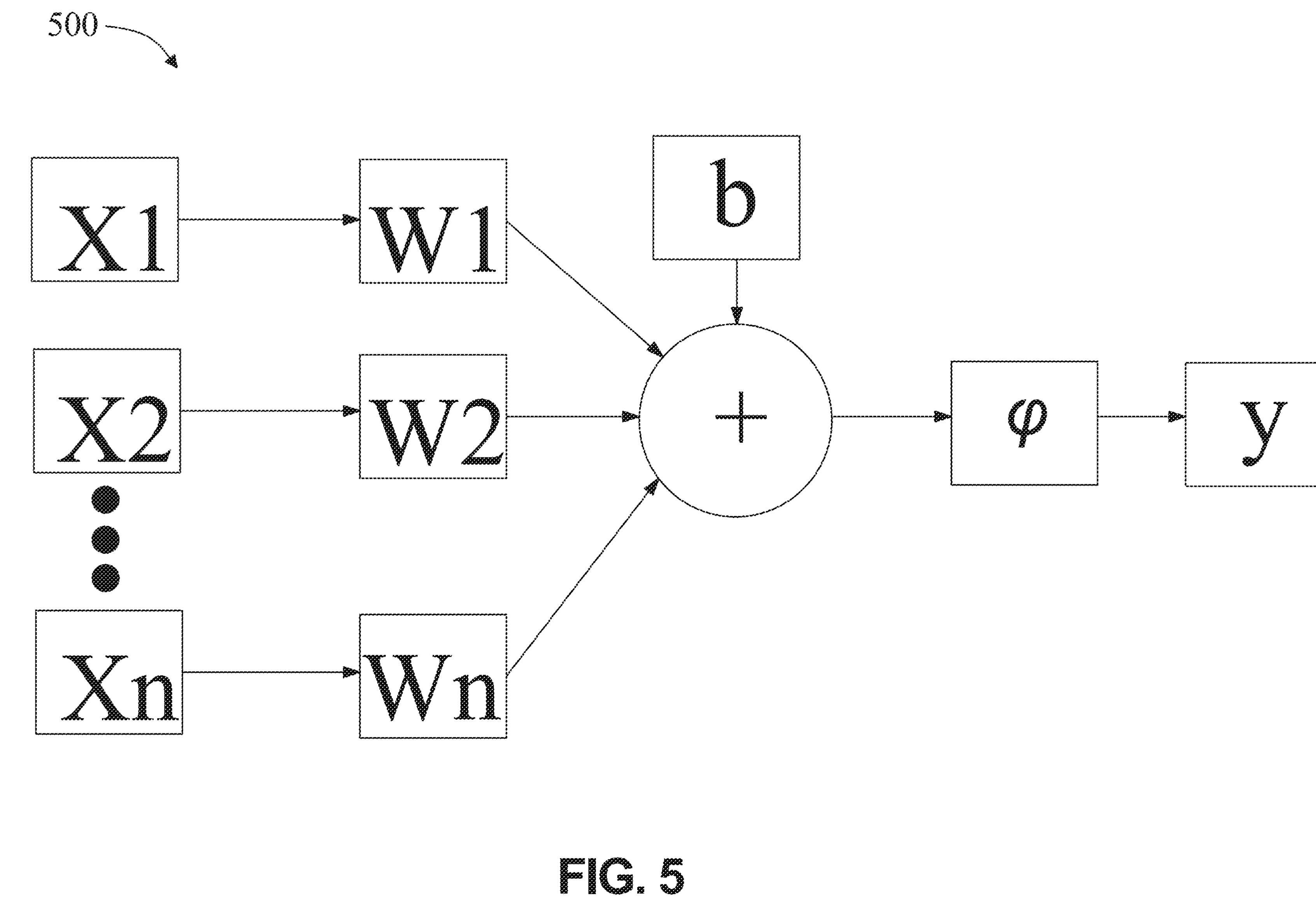
FIG. 5 illustrates a block diagram of an exemplary node in a neural network.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
FIG. 6 illustrates a flow diagram of an exemplary method of secure data partitioning and zero-retention AI interaction.

Referring now to FIG. 6, a flow diagram of an exemplary method 600 of secure data partitioning and zero-retention artificial intelligence (AI) interaction. Method 600 contains a step 605 of receiving, using at least a processor, at least a user response from a graphical user interface. In some embodiments, receiving the at least a user response may include retrieving user data from the first partition of the plurality of partition of the internal database, generating and presenting, using the graphical user interface, an onboarding quiz as a function of the user data, and receiving the at least a user response as a function of the onboarding quiz. In some embodiments, generating and presenting the onboarding quiz may include receiving a user credential from a user device, assigning an access level to the user device as a function of the user credential, and selectively generating and presenting the onboarding quiz as a function of the access level. In some embodiments, receiving the at least a user response may include determining a completeness score of the user response as a function of one or more validation parameters, and generating and transmitting, to a user device, a request prompt as a function of the completeness score. In some embodiments, receiving the at least a user response may include generating, using an internal embedding engine, one or more response embeddings corresponding to the user response. These may be implemented as described and referenced with respect to FIGS. 1-5.

With continued reference to FIG. 6, method 600 contains a step 610 of storing, using at least a processor, at least a user response within a first partition of a plurality of partitions of an internal database. This may be implemented as described and referenced with respect to FIGS. 1-5.

With continued reference to FIG. 6, method 600 contains a step 615 of executing, using at least a processor, a data minimization pipeline on at least a stored user response to generate at least a minimized user response, wherein the at least a minimized user response is stored in a second partition of the internal database, wherein the second partition is isolated from the first partition by an access control policy. In some embodiments, executing the data minimization pipeline may include identifying and extracting at least a direct identifier from the user response, and replacing the at least a direct identifier using one or more data masks. In some embodiments, replacing the at least a direct identifier may include retrieving at least a consent flag from the first partition of the internal database, and replacing the at least a direct identifier as a function of the at least a consent flag. In some embodiments, the zero-retention gateway may include a transient data buffer configured with an expiration time threshold to delete transmitted data after completion of model inference by the at least an AI model endpoint. These may be implemented as described and referenced with respect to FIGS. 1-5.

With continued reference to FIG. 6, method 600 contains a step 620 of routing, using at least a processor and from a second partition, at least a minimized user response to at least an AI model endpoint through a zero-retention gateway. In some embodiments, routing the at least a minimized user response may include selecting one of the at least an AI model endpoint as a function of the at least a minimized user response, and routing the at least a minimized user response to the selected AI model endpoint. These may be implemented as described and referenced with respect to FIGS. 1-5.

With continued reference to FIG. 6, method 600 contains a step 625 of receiving, using at least a processor, an AI-generated response from at least an AI model endpoint through a zero-retention gateway, wherein receiving the AI-generated response includes transiently storing the AI-generated response in a third partition of the internal database for a session duration. These may be implemented as described and referenced with respect to FIGS. 1-5.

With continued reference to FIG. 6, method 600 contains a step 630 of modifying, using at least a processor, a graphical user interface to include an AI-generated response retrieved from a third partition and associated data retrieved from at least one of a first partition and a second partition. In some embodiments, modifying the graphical user interface may include selectively modifying the graphical user interface as a function of the access level, wherein selectively modifying the graphical user interface may include modifying, in response to a first access level, the graphical user interface to include data from the first partition, and modifying, in response to a second access level, the graphical user interface to include data from the second partition. These may be implemented as described and referenced with respect to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
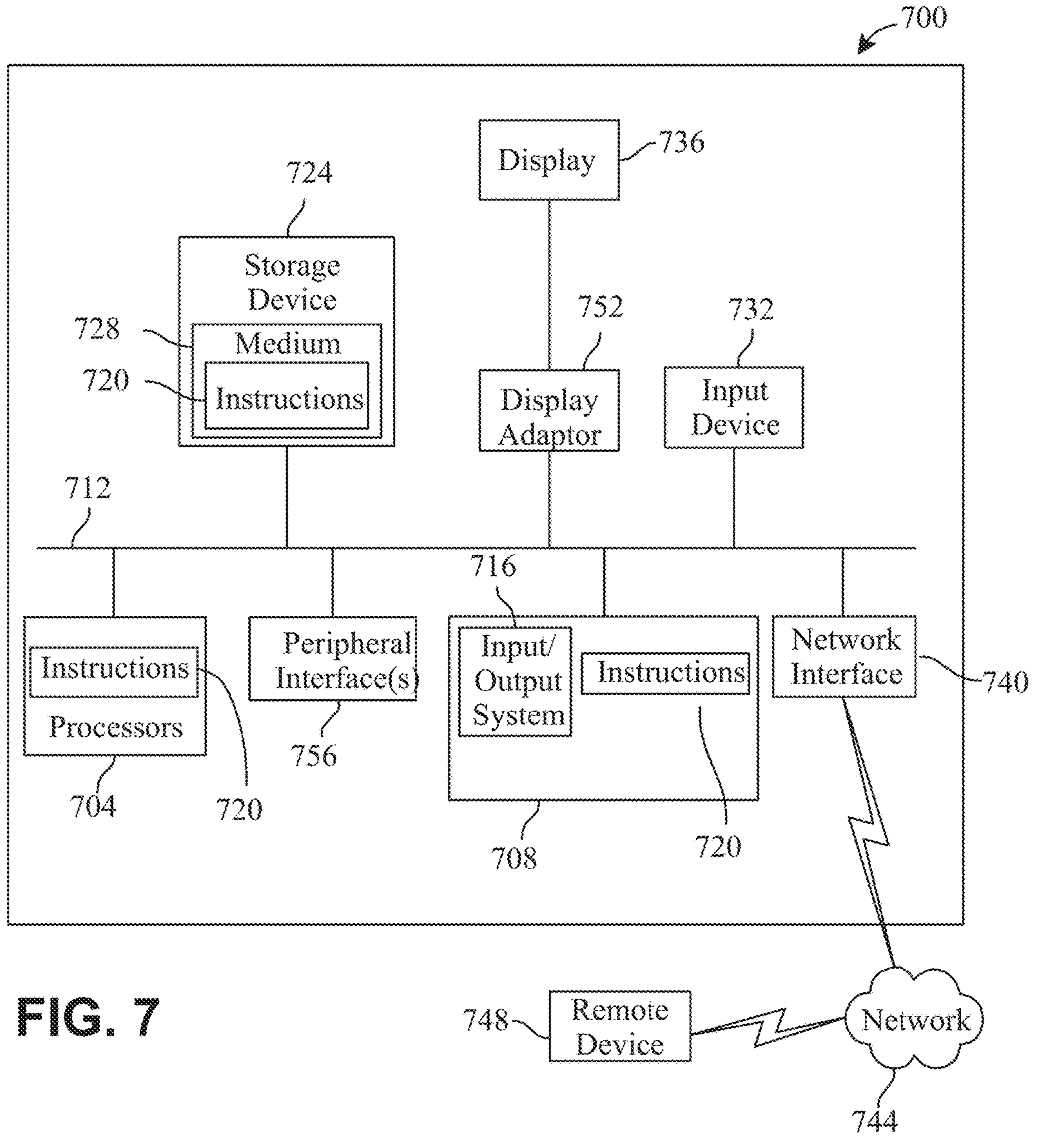
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may include (e.g., stored on one or more machine-readable media) instructions (e.g., software) 720 embodying any one or more of the aspects and/or methodologies of the present disclosure. In another example, memory 708 may include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. In some embodiments, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 8:
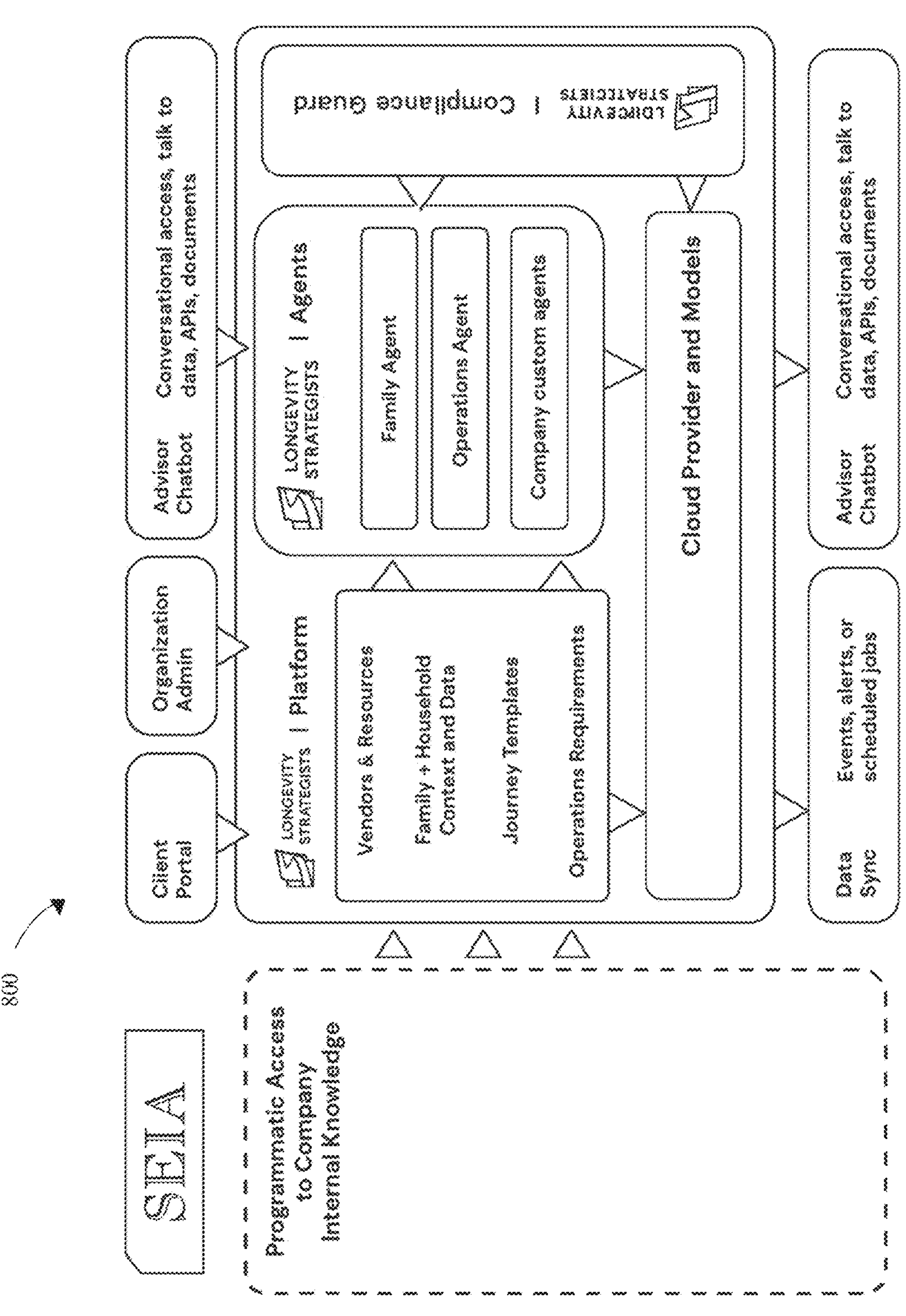
FIG. 8 is an exemplary diagram of a multi-layer artificial intelligence system.

Referring to FIG. 8, an exemplary diagram 800 of a multi-layer artificial intelligence system is illustrated. An exemplary diagram 800 illustrates a high-level architectural view of an enterprise-integrated artificial intelligence platform configured to operate within regulated environments such as financial advisory and professional services. Diagram 800 depicts the manner in which multiple subsystems, including enterprise data sources, a core platform layer, specialized artificial-intelligence agents, cloud-based model execution environments, and a compliance guard, interoperate to provide secure, context-aware, and regulation-aligned AI functionality.

With continued reference to FIG. 8, diagram 800 includes a programmatic access layer disposed on the left side of the figure. In some embodiments, the programmatic access layer may include secure connectors, ingestion pipelines, and authenticated APIs configured to retrieve enterprise data from internal systems such as meeting systems, messaging systems, planning platforms, and account-management tools. As described in the due diligence materials, such data ingestion may occur via SOC-2-aligned interfaces using encryption, access controls, and identity-management mechanisms such as Single Sign-On (SSO). These programmatic interfaces allow the system to access and synchronize structured and unstructured data across corporate applications including meetings, emails, SMS messages, advisor notes, plans, and account information.

With continued reference to FIG. 8, diagram 800 further includes a core platform layer that functions as the chassis upon which downstream agents operate. In some embodiments, the core platform layer may include vendor and resource repositories, a family and household context model, journey templates, and operational and compliance requirements. The family and household context model may represent multi-person household structures, relationships among household members, life-stage attributes, caregiving contexts, and temporal events, enabling AI agents to reason about a system of individuals rather than a single client. Journey templates may define sequenced processes tailored to client needs, such as retirement transitions, caregiving events, or financial-planning workflows. Operational requirements may include firm-specific procedures, regulatory rules, and compliance-guardrails. This platform layer forms the "canvas" upon which all agents perform reasoning tasks, ensuring that AI outputs remain aligned with institutional processes and household-level context.

With continued reference to FIG. 8, diagram 800 also illustrates a multi-agent layer comprising a plurality of specialized agents, such as a family agent, an operations agent, and one or more enterprise-specific custom agents. In some embodiments, the family agent may evaluate family-context data and provide personalized insights relating to household dynamics, care-coordination needs, or vulnerability indicators. The operations agent may evaluate advisor actions or client requests against internal procedures and regulatory constraints. Custom agents may enable firms to encode proprietary reasoning processes or domain-specific expertise. The system may be intentionally designed to support multiple agents operating concurrently over the same contextual dataset, allowing more robust and auditable decision-making than a monolithic model.

With continued reference to FIG. 8, diagram 800 includes a compliance guard subsystem positioned adjacent to the multi-agent layer. In some embodiments, the compliance guard subsystem may enforce role-based access control, validate outbound language-model requests, redact sensitive data, block non-permissible content, and ensure that agents do not violate regulatory constraints or modify enterprise data without explicit authorization. The due diligence questionnaire highlights internal controls such as audit logging, encryption, incident-response policies, third-party risk frameworks, and access-review cycles, all of which may be enforced or integrated into the compliance guard subsystem.

This subsystem is architecturally independent from the agents and serves as a non-bypassable security and compliance layer, ensuring technical safeguards rather than policy-level guidance alone.

With continued reference to FIG. 8, diagram 800 further includes a cloud provider and model execution layer, which may utilize infrastructure. In some embodiments, this cloud layer may host large language models, vector search engines, agent orchestration tools, and scheduled compute jobs. The system may rely on cloud-provider services for secure execution of model inference, credential-isolated API access, and scaling of computational workloads. As described in the due diligence documentation, the cloud layer may implement SOC-2-aligned security controls including vulnerability scanning, network segmentation, and multi-factor authentication.

With continued reference to FIG. 8, diagram 800 also includes several user-facing interfaces, such as a client portal, an organization-administration console, and an advisor chatbot. In some embodiments, the advisor chatbot may provide conversational access to enterprise knowledge, household context, and compliant operational workflows. The client portal may present adaptive journeys and context-appropriate information to end users. The organization-administration console may permit enterprise users to manage custom agents, resource libraries, compliance configurations, and operational rules. Role-based permissions, as noted in the due diligence materials, may govern access to each interface to ensure that users interact only with authorized system components.

With continued reference to FIG. 8, the multi-layer artificial intelligence system shown therein may be employed to support, extend, and operationalize the secure data-handling architecture illustrated in FIG. 1. In some embodiments, FIG. 8 provides the broader enterprise environment, comprising data ingestion pipelines, contextual modeling layers, specialized AI agents, compliance controls, and cloud-based inference infrastructure, within which the apparatus 100 of FIG. 1 can function as a privacy-preserving interaction and data-processing node. The programmatic access layer of FIG. 8, for example, may operate as the upstream ingestion framework through which user devices 204*a-b* of FIGS. 2A-B transmit user responses 106 from graphical user interface 108 into the first partition of internal database 112 described in FIG. 1. By leveraging encrypted data pipelines, authenticated APIs, and SOC-2-aligned connectors, the FIG. 8 architecture ensures that raw user responses are securely communicated into apparatus 100 for storage, minimization, and inference routing. Similarly, the household and family-context models, journey templates, and operational rules stored within the core platform layer of FIG. 8 may provide contextual parameters and domain-specific knowledge that processor 102 can use to generate onboarding quizzes 114, determine validation parameters 140, evaluate completeness scores 142, and tailor AI-generated responses 132 returned to a user device 204*a-b*.

With continued reference to FIG. 8, the multi-agent layer depicted therein may serve as an internal collection of AI provider endpoints to which apparatus 100 can route minimized user responses 120 through the zero-retention gateway 122. For example, depending on the semantic or contextual properties of a minimized user response 120 stored in the second partition 118*b* of FIG. 1, processor 102 may select a family agent, operations agent, compliance agent, or custom enterprise agent from FIG. 8, each configured to perform domain-specific inference without accessing raw identifiers stored in the first partition. The compliance guard subsystem shown in FIG. 8 may reinforce the isolation boundaries and access-control policies of FIG. 1 by ensuring that only minimized, policy-compliant payloads may be transmitted for model inference. In some embodiments, the cloud-based model-execution layer of FIG. 8 may host one or more AI model endpoints 128 referenced in FIG. 1, while the advisor chatbot, administrative console, or client portal in FIG. 8 may incorporate the graphical user interface modifications described in FIG. 1 and FIGS. 2A-B. Through this alignment, the FIG. 8 system may provide the enterprise-scale intelligence, contextual resources, and compliance infrastructure necessary for apparatus 100 to generate dashboards containing user responses 106, AI-generated responses 132, and minimized user responses 120, each retrieved from their respective partitions and rendered securely in real time.

What is claimed is:

1. An apparatus for secure data partitioning and zero-retention artificial intelligence (AI) interaction, the apparatus comprising:

at least a processor; and a memory communicatively connected to the at least a processor, wherein the memory contains instructions configuring the at least a processor to:

receive at least a user response from a graphical user interface;

store the at least a user response within a first partition of a plurality of partitions of an internal database;

execute a data minimization pipeline on the at least a stored user response to generate at least a minimized user response, wherein the at least a minimized user response is stored in a second partition of the internal database, wherein the second partition is isolated from the first partition by an access control policy;

route, from the second partition, the at least a minimized user response to at least an AI model endpoint through a zero-retention gateway;

receive an AI-generated response from the at least an AI model endpoint through the zero-retention gateway, wherein receiving the AI-generated response comprises transiently storing the AI-generated response in a third partition of the internal database for a session duration; and modify the graphical user interface to comprise the AI-generated response retrieved from the third partition and associated data retrieved from at least one of the first partition and the second partition;

wherein receiving the at least a user response comprises: retrieving user data from the first partition of the plurality of partitions of the internal database; generating and presenting, using the graphical user interface, an onboarding quiz as a function of the user data; and receiving the at least a user response as a function of the onboarding quiz;

wherein generating and presenting the onboarding quiz comprises: receiving a user credential from a user device; assigning an access level to the user device as a function of the user credential; and selectively generating and presenting the onboarding quiz as a function of the access level.

2. The apparatus of claim 1, wherein modifying the graphical user interface comprises selectively modifying the graphical user interface as a function of the access level, wherein selectively modifying the graphical user interface comprises:

modifying, in response to a first access level, the graphical user interface to comprise data from the first partition; and modifying, in response to a second access level, the graphical user interface to comprise data from the second partition.

3. The apparatus of claim 1, wherein receiving the at least a user response comprises:

determining a completeness score of the at least a user response as a function of one or more validation parameters; and generating and transmitting, to a user device, a request prompt as a function of the completeness score.

4. The apparatus of claim 1, wherein receiving the at least a user response comprises generating, using an internal embedding engine, one or more response embeddings corresponding to the at least a user response.

5. The apparatus of claim 1, wherein executing the data minimization pipeline comprises: identifying and extracting at least a direct identifier from the at least a user response; and replacing the at least a direct identifier using one or more data masks.

6. The apparatus of claim 5, wherein replacing the at least a direct identifier comprises: retrieving at least a consent flag from the first partition of the internal database; and replacing the at least a direct identifier as a function of the at least a consent flag.

7. The apparatus of claim 1, wherein the zero-retention gateway comprises a transient data buffer configured with an expiration time threshold to delete transmitted data after completion of model inference by the at least an AI model endpoint.

8. The apparatus of claim 1, wherein routing the at least a minimized user response comprises:

selecting one of the at least an AI model endpoint as a function of the at least a minimized user response; and routing the at least a minimized user response to the selected AI model endpoint.

9. A method of secure data partitioning and zero-retention artificial intelligence (AI) interaction, the method comprising:

receiving, using at least a processor, at least a user response from a graphical user interface;

storing, using the at least a processor, the at least a user response within a first partition of a plurality of partitions of an internal database;

executing, using the at least a processor, a data minimization pipeline on the at least a stored user response to generate at least a minimized user response, wherein the at least a minimized user response is stored in a second partition of the internal database, wherein the second partition is isolated from the first partition by an access control policy;

routing, using the at least a processor and from the second partition, the at least a minimized user response to at least an AI model endpoint through a zero-retention gateway;

receiving, using the at least a processor, an AI-generated response from the at least an AI model endpoint through the zero-retention gateway, wherein receiving the AI-generated response comprises transiently storing the AI-generated response in a third partition of the internal database for a session duration; and modifying, using the at least a processor, the graphical user interface to comprise the AI-generated response retrieved from the third partition and associated data retrieved from at least one of the first partition and the second partition;

wherein receiving the at least a user response comprises: retrieving user data from the first partition of the plurality of partitions of the internal database; generating and presenting, using the graphical user interface, an onboarding quiz as a function of the user data; and receiving the at least a user response as a function of the onboarding quiz;

wherein generating and presenting the onboarding quiz comprises: receiving a user credential from a user device; assigning an access level to the user device as a function of the user credential; and selectively generating and presenting the onboarding quiz as a function of the access level.

10. The method of claim 9, wherein modifying the graphical user interface comprises selectively modifying the graphical user interface as a function of the access level, wherein selectively modifying the graphical user interface comprises:

modifying, in response to a first access level, the graphical user interface to comprise data from the first partition; and modifying, in response to a second access level, the graphical user interface to comprise data from the second partition.

11. The method of claim 9, wherein receiving the at least a user response comprises:

determining a completeness score of the at least a user response as a function of one or more validation parameters; and generating and transmitting, to a user device, a request prompt as a function of the completeness score.

12. The method of claim 9, wherein receiving the at least a user response comprises: generating, using an internal embedding engine, one or more response embeddings corresponding to the at least a user response.

13. The method of claim 9, wherein executing the data minimization pipeline comprises: identifying and extracting at least a direct identifier from the at least a user response; and replacing the at least a direct identifier using one or more data masks.

14. The method of claim 13, wherein replacing the at least a direct identifier comprises: retrieving at least a consent flag from the first partition of the internal database; and replacing the at least a direct identifier as a function of the at least a consent flag.

15. The method of claim 9, wherein the zero-retention gateway comprises a transient data buffer configured with an expiration time threshold to delete transmitted data after completion of model inference by the at least an AI model endpoint.

16. The method of claim 9, wherein routing the at least a minimized user response comprises:

selecting one of the at least an AI model endpoint as a function of the at least a minimized user response; and routing the at least a minimized user response to the selected AI model endpoint.

* * * * *